(12) United States Patent
Weber et al.

(10) Patent No.: US 9,390,412 B2
(45) Date of Patent: Jul. 12, 2016

(54) DYNAMIC POINT OF SALE SYSTEM INTEGRATED WITH READER DEVICE

(71) Applicant: Visa International Service Association, San Francisco, CA (US)

(72) Inventors: Lance Weber, Longmont, CO (US); Keith Bailey, Orem, UT (US)

(73) Assignee: Visa International Service Association, San Francisco, CA (US)

( * ) Notice: Subject to any disclaimer, the term of this patent is extended or adjusted under 35 U.S.C. 154(b) by 188 days.

(21) Appl. No.: 14/054,647

(22) Filed: Oct. 15, 2013

(65) Prior Publication Data
US 2014/0108172 A1    Apr. 17, 2014

Related U.S. Application Data

(60) Provisional application No. 61/714,721, filed on Oct. 16, 2012, provisional application No. 61/730,934, filed on Nov. 28, 2012, provisional application No. 61/793,810, filed on Mar. 15, 2013, provisional application No. 61/870,758, filed on Aug. 27, 2013.

(51) Int. Cl.
| | |
|---|---|
| *G06Q 20/20* | (2012.01) |
| *G06Q 20/34* | (2012.01) |
| *G06Q 30/00* | (2012.01) |
| *G06Q 20/38* | (2012.01) |

(52) U.S. Cl.
CPC .............. *G06Q 20/204* (2013.01); *G06Q 20/20* (2013.01); *G06Q 20/34* (2013.01); *G06Q 20/3823* (2013.01); *G06Q 30/00* (2013.01)

(58) Field of Classification Search
CPC ........ G06Q 20/20; G06Q 30/00; G06Q 20/34
USPC ...................................... 705/15–18
See application file for complete search history.

(56) References Cited

U.S. PATENT DOCUMENTS

| | | | |
|---|---|---|---|
| 5,550,561 A * | 8/1996 | Ziarno | 345/163 |
| 5,745,576 A | 4/1998 | Abraham | |
| 6,560,709 B1 * | 5/2003 | Galovich | 713/185 |

(Continued)

OTHER PUBLICATIONS

Clifford, C., "iPad, Tablet Point-of-Sale Systems Gain Popularity," Entrepreneur.com, [online], May 31, 2013, [retrieved on Oct. 14, 2013], retrieved from the internet <URL: http://www.entrepreneur.com/article/226874>, 4 pages.

*Primary Examiner* — Ramsey Refai
(74) *Attorney, Agent, or Firm* — Kilpatrick Townsend & Stockton LLP

(57) ABSTRACT

Embodiments of the present invention are directed to methods, systems, and apparatuses for enabling payment information received via a reader device coupled to a mobile point-of-sale (POS) terminal to be communicated in a secure manner to a third party service provider for payment processing of a transaction between a merchant and a consumer. Some embodiments are directed to communication of the payment information received from a reader device using a payment processing mechanism (e.g., a hosted order page) of the merchant to process payment information via the third party service provider in a secure manner. The reader device can encrypt payment information using a third party encryption mechanism, such as derived unique key per transaction (DUKPT). The third party encryption mechanism can be used or accessed by the third party service provider to enable end-to-end security for payment processing.

20 Claims, 11 Drawing Sheets

(56) References Cited

U.S. PATENT DOCUMENTS

| | | | | |
|---|---|---|---|---|
| 7,043,643 B1* | 5/2006 | Doe | G06F 21/34 | |
| | | | 713/186 | |
| 7,703,676 B2* | 4/2010 | Hart | G06Q 20/382 | |
| | | | 235/380 | |
| 2001/0027439 A1* | 10/2001 | Holtzman et al. | 705/39 | |
| 2002/0038286 A1* | 3/2002 | Koren et al. | 705/40 | |
| 2003/0192948 A1* | 10/2003 | Izuyama | G06K 7/084 | |
| | | | 235/449 | |
| 2004/0037121 A1* | 2/2004 | Shinriki | G06F 21/445 | |
| | | | 365/200 | |
| 2004/0182921 A1* | 9/2004 | Dickson | G07F 7/1025 | |
| | | | 235/380 | |
| 2008/0029593 A1 | 2/2008 | Hammad | | |
| 2013/0031006 A1 | 1/2013 | McCullagh | | |
| 2013/0198080 A1 | 8/2013 | Anderson | | |
| 2013/0212026 A1 | 8/2013 | Powell | | |

* cited by examiner

DYNAMIC POINT OF SALE SYSTEM INTEGRATED WITH READER DEVICE

CROSS-REFERENCES TO RELATED APPLICATIONS

The present application claims priority and benefit from:
1) U.S. Provisional Application No. 61/714,721, filed Oct. 16, 2012, entitled "MOBILE PAYMENT GATEWAY UTILIZING PUBLIC KEY";
2) U.S. Provisional Application No. 61/730,934, filed Nov. 28, 2012, entitled "SYSTEM AND METHOD INCLUDING HOSTED ORDER PAGE AND DEVICE READER";
3) U.S. Provisional Application No. 61/793,810, filed Mar. 15, 2013, entitled "DYNAMIC MOBILE POINT OF SALE SYSTEM"; and
4) U.S. Provisional Application No. 61/870,758, filed Aug. 27, 2013, entitled "MOBILE POINT OF SALE SYSTEM".

The entire contents of each of the above-identified provisional patent applications are incorporated herein by reference for all intent and purposes.

BACKGROUND

Embodiments of the present invention relates generally to payment processing, and more specifically to integration of a card reader device with point of sale systems to process payment information.

Today consumers have different ways to purchase goods or services from a particular merchant. Many merchants today accept payments for transactions through their websites as well as at their physical point-of-sale (POS) terminals. These types of transactions may not be processed in the same manner, but can be communicated to a third party payment processing system for processing of payment information. For example, goods and services may be purchased from the merchant remotely over the Internet or may be purchased in person at a store operated by the merchant. In a store, merchants may operate traditional, fixed point of sale (POS) system through which a customer can complete a retail transaction to provide payment to the merchant in exchange for goods or services. However, stationary POS systems do not enable mobility because of dependency on equipment needed to support operation of the POS system.

The advent of reader devices, such as Square®, have enabled use of mobile computing devices to conduct payment transactions. However, such implementations involve implementation of custom software or applications that are configured to process payment information for a merchant. These reader devices may not afford users control over look and experience. Further, reader devices do not enable merchants control over functions accessible by a merchant's commerce system, such as receipt handling and checkout processes. Many reader devices limit functionality to applications provider by a manufacturer or seller of the reader device. As such, merchants are unable to integrate existing point of sale systems with reader devices for a complete and integrated mobile point of sale system. Solutions are needed to communicate the payment information obtained via a card reader device to a third party payment processing system (e.g., a third party service provider) to a process transactions. A system is needed in which a merchant can leverage functions of an existing merchant commerce system to handle processing of payment information obtained from a reader device integrated with computing device.

Embodiments of the present invention solve these problems and other problems individually and collectively.

SUMMARY

Embodiments of the present invention are directed to methods, systems, and apparatuses for enabling payment information received via a reader device coupled to a mobile computing device, such as a mobile point-of-sale (POS) terminal, to be communicated to a third party service provider in a secure manner. Specifically, preferred embodiments are directed to communication of the payment information using payment processing mechanisms of a merchant to process payment information via the third party service provider in a secure manner. To illustrate, such existing payment processing mechanisms can include submission via a hosted order page (HOP) or a silent order post (SOP) provided by a third party service provider for secure communication of the payment information for payment processing. To ensure compliance with security procedures for handling of sensitive payment information, the reader device can encrypt payment information using a third party encryption mechanism, such as derived unique key per transaction (DUKPT). The third party encryption mechanism can be used or accessed by the third party service provider to enable end-to-end security for payment processing. Additionally, the POS terminal can be configured for security compliance, such as the Payment Card Industry Data Security Standard (PCI DSS).

Implementations of some embodiments, enable merchants to integrate use of a reader device with merchant-specific payment processing mechanisms to leverage and maintain security functions implemented in merchant systems. Integration with merchant-specific payment processing mechanisms enable merchants to maintain control over user experience with payment processing functions. Merchants can avoid reliance on third party reader device solutions (e.g., Square®) that may not be modifiable or configurable for integration with a merchant's commerce system, such as a merchant website. Further, third party reader device solutions may not enable compliance with certain security standards for merchant systems. Embodiments of the present invention enable merchants to avoid costs and effort to comply with security and regulations for solutions in which the mobile computing device stores sensitive payment information.

To further illustrate, in some embodiments of the invention, a mobile computing device can provide the payment information obtained via a reader device to a third party payment processing system via a HOP provided by a merchant service provider. The mobile computing device can include a module (e.g., a native application) that can communicate with the merchant service provider to receive a customer HOP to operate the reader device to obtain encrypted payment information. The module can facilitate communication of the payment information via the HOP to the merchant service provider to submit payment information to a payment processing system. Such a mobile computing device can be used as a mobile POS terminal in a merchant store. Such use of a mobile computing device can enable a merchant to increase a presence of terminals throughout a store, thereby reducing reliance on fixed, traditional POS terminals. A greater availability of mobile POS terminals in a merchant store can improve customer experience by reducing time customer spend to checkout at a merchant store. The reduction in time to conduct a transaction can translate to increases more purchase transactions for the merchant.

One embodiment of the present invention is directed to a method performed by a server computer of a service provider (e.g., a merchant service provider). The method includes receiving a session request to establish a session for communication with a computing device to conduct a payment transaction between a merchant and a consumer. The server computer can sends activation information to the computing device. The activation information identifies a location of a webpage on the server computer. The webpage enables operation of a reader device to receive payment information. The method further includes receiving the payment information via an order form of the web page. The order form includes the payment information received from the reader device. The payment information is encrypted. The method further includes processing the payment transaction based on the received payment information.

Another embodiment is directed to a gateway server computer including one or more processors and one or more memory devices coupled to the one or more processors. The one or more memory devices include instructions executable by the one or more processors to perform a method. The method includes receiving a session request to establish a session for communication with a computing device to conduct a payment transaction between a merchant and a consumer. The method further includes sending activation information to the computing device. The activation information identifies a location of a webpage in the one or more memory devices. The webpage enables operation of a reader device to receive payment. The method includes receiving the payment information via an order form of the web page. The order form includes the payment information received from the reader device. The payment information is encrypted. The method further includes processing the payment transaction based on the received payment information.

Another embodiment is directed to a system including a client system and a server system. The client system is configured to send to a merchant system a request to initiate payment for a payment transaction between a merchant and a consumer. The client system is further configured to receive activation information from a server computer of a service provider. The activation information identifies a location of a webpage in the server computer. The webpage enables operation of a reader device to receive payment. The client system is further configured to receive the payment information from the reader device in response to input received via the webpage. The payment information is encrypted. The client system is further configured to insert the payment information into an order form of the web page. The client system is configured to cause the payment information to be submitted to the server computer via the order form of the web page for payment processing. The server system is configured to receive a session request to establish a session for communication with the client system to conduct the payment transaction. The session request is received from a merchant system in response to receiving the request to initiate payment. The server system is configured to send the activation information to the client system. The server system is configured to receive the payment information via the order form of the web page. The server system is configured to process the payment transaction based on the received payment information.

Another embodiment is directed to a method performed by a computing device (e.g., a client device). The method includes sending a request to a merchant system to initiate payment for a transaction between a merchant and a consumer. The method further includes receiving activation information from a server computer of a service provider. The activation information identifies a location of a webpage in the server computer. The webpage enables operation of a reader device to receive payment. The method include receiving the payment information from the reader device in response to input received via the webpage. The payment information is encrypted. The method includes inserting the payment information into an order form of the web page. The method includes causing the payment information to be submitted to the server computer via the order form of the web page for payment processing.

These and other embodiments of the invention are described in detail below.

BRIEF DESCRIPTION OF THE DRAWINGS

Like reference numbers and designations in the various drawings indicate like elements.

DETAILED DESCRIPTION

Figure 1:
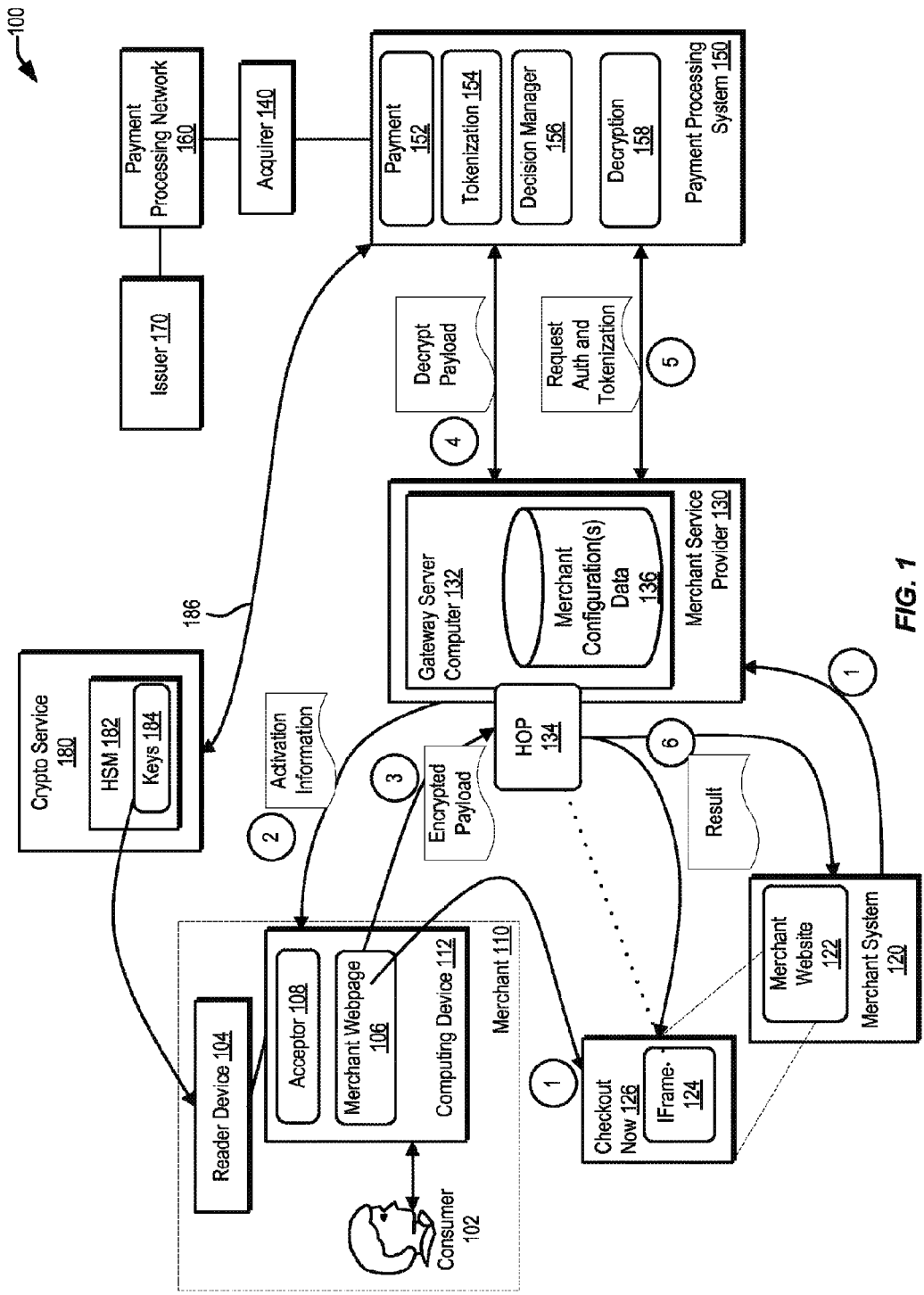
FIG. 1 is a block diagram illustrating a computing system according to one embodiment of the present invention.

Embodiments of the present invention are directed to methods, systems, and apparatuses for enabling payment information received via a reader device coupled to a mobile computing device, such as a mobile point-of-sale (POS) terminal, to be communicated to a third party service provider in a secure manner. Specifically, preferred embodiments are directed to communication of the payment information using payment processing mechanisms of a merchant to process payment information via the third party service provider in a secure manner.

A third-party service provider, which is neither the merchant nor the customer, uses the payment information entered by the customer to process the payment transaction for the merchant so that the merchant can avoid handling the customer's payment information, and thereby avoid the cost and effort of complying with Payment Card Industry Data Security Standard (PCI DSS) and government regulations regarding storing sensitive payment information. To ensure compliance with security procedures for handling of sensitive payment information, the reader device can encrypt payment information using a third party encryption mechanism, such as derived unique key per transaction (DUKPT). The third party encryption mechanism can be used or accessed by the third party service provider to enable end-to-end security for payment processing. Additionally, the POS terminal can be configured for security compliance, such as the PCI DSS, to enable merchants to remain compliant with security standards.

In an embodiment, a mobile computing device can communicate payment information obtained via a reader device to a third party payment processing system via a HOP provided by a merchant service provider. The mobile computing device can include a module (e.g., a native application) that can communicate with the merchant service provider to receive a customer HOP to operate the reader device to obtain encrypted payment information. The HOP can be provided by the merchant service provider when a user initiates a request at a merchant website to "checkout," or process payment information. The module can facilitate communication of the payment information via the HOP to the merchant service provider to submit payment information to a payment processing system. A result of the payment processing can be provided back to the mobile computing device for display.

In an illustrative example, a consumer can travel to a merchant's physical store location seeking a product or a service. While shopping at the store, the consumer decides to purchase a product at the store. Rather than wait to order an unavailable product at a later time, the consumer can conveniently access one of many mobile POS terminals in the store to easily place an order for a desired product. According to an embodiment described herein, the consumer can access the merchant's website via a mobile POS to navigate to a product page. Once a user initiates a request to purchase a good, such as by selecting a "checkout now" button, the mobile POS can receive a custom HOP to display at the mobile POS. The customer HOP can be received from The mobile POS activates a reader device on the mobile POS to receive payment information. Once the consumer provides payment information, the payment information is submitted, without consumer or merchant involvement, to a third party merchant service provider (e.g., Cybersource®). The payment information received at the reader device is encrypted and inserted into a HOP for communication to the merchant service provider. The merchant service provider can process the payment information by decrypting the payment information and determining a request for authorization of the payment. A result of the payment processing can be communicated back to the merchant's system and to the mobile POS to provide order confirmation.

Embodiments of the present invention enable merchant service providers that provide hosted shopping cart services to provide support to enable merchant terminals (e.g., tablet POS terminals and mobile POS terminals) to interface to merchant service providers. Merchant service providers can provide customized HOPs for presentation on mobile devices. Merchant service provides can provide additional support for mobile POS terminals to provide functions such as menu services for restaurants to increase a presence of POS terminals. Mobile POS terminal implemented as described herein can be used for merchant to order goods and supplies for merchant's business.

Prior to discussing the specific embodiments of the invention, a further description of some terms can be provided for a better understanding of embodiments of the invention.

According to some embodiments, "transaction data" can include any data associated with one or more transactions. In some embodiments, the transaction data may merely include an account identifier or payment token. Alternatively, in other embodiments, the transaction data may include any information generated, stored, or associated with a merchant, consumer, account, or any other related information to a transaction. For example, transaction data may include data in an authorization request message that is generated in response to a payment transaction being initiated by a consumer with a merchant. Alternatively, transaction data may include information associated with one or more transactions that have been previously processed and the transaction information has been stored on a merchant database or other merchant computer. The transaction data may include an account identifier associated with the payment instrument used to initiate the transaction, consumer personal information, products or services purchased, or any other information that may be relevant or suitable for transaction processing. Additionally, the transaction information may include a payment token or other tokenized or masked account identifier substitute that may be used to complete a transaction and protect the underlying account information of the consumer.

Additionally, in some embodiments, there may be different types of transaction data including e-commerce transaction data, retail transaction data, mobile transaction data, etc. For example, each type of transaction data may be dependent on the type of transaction or the channel in which the transaction is initiated (e.g., an e-commerce transaction initiated over the internet may generate e-commerce transaction data). Each type of transaction data may comprise different types of data or may comprise the same type of data. For example, a retail transaction may generate retail transaction data when a consumer swipes a credit card at a point-of-sale terminal of a merchant. The retail transaction data may comprise Track 1 and/or Track 2 payment data included on the magnetic stripe or chip of the consumer's credit card (or other payment device). Accordingly, the retail transaction data may comprise the Track 1 and/or Track 2 data as well as additional data associated with the consumer, merchant, account associated with the payment device, or any other information.

Furthermore, in some embodiments, multiple types and instances of transaction data may be received and processed. For example, "first transaction data" and "second transaction data" may include separate transaction data that is generated by transactions that are separated by time, merchant, merchant location, consumer location, transaction type, or any other variable that would cause transaction data associated with a single consumer account to be separated into two different messages or pieces of data. For example, first transaction data may be related to a first transaction originated at a first time and second transaction data may relate to a second transaction initiated at a second time. In some embodiments, the first transaction data and the second transaction data may be received by components within the transaction system at the same time (e.g., in a single communication message) or may be received at two different times (e.g., in separate messages). Accordingly, transaction data may comprise any number of transaction data (e.g., first transaction data, second transaction data, third transaction data, etc.) associated with any number of transactions. First transaction data and second transaction data may be related to transactions that are completed by the same consumer or another person using the consumer's same underlying primary account identifier. For example, a consumer may initiate a first transaction that generates first transaction data and then a friend or agent of the consumer may initiate a second transaction on behalf of the consumer using their credit card or other payment device that generates second transaction data.

A "payment token" may include any series or combination of characters, numerals, or other identifiers that represent an account being used in a payment transaction and may be substituted for a primary account identifier during a transaction. For example, a payment token may include a masked, tokenized, or substitute account identifier that may be used instead of the consumer's primary account identifier, in order to protect the security of the consumer's account information. For instance, during a payment transaction that is initiated over the internet, a merchant processor may be utilized to process the internet or e-commerce transactions. In order to protect the consumer's primary account identifier, the merchant processor may interface with the merchant's online store and may embed a hosted order page (HOP) or silent order page (SOP) in order to process the transactions on the merchant's behalf. In order to protect the consumer's account identifier, the HOP/SOP page may tokenize or mask the account information entered by a consumer during a transaction so that if the electronic communication over the internet is intercepted by a malicious third party, no sensitive account information may be stolen that could be used to initiate unauthorized transactions. The tokenized account information or payment token may be useless without the malicious third party knowing the tokenization or masking algorithm. Accordingly, the payment token may be derived from the primary account identifier.

A "primary account identifier" may include any series or combination of digits, alphanumeric characters, numbers, or graphics that may identify or be associated with a consumer's issued account at an account issuer or bank. Typically, a primary account identifier may include both an account identifier portion as well as a bank or issuer identifier (BIN) so that a payment processing network may determine which issuer is associated with the primary account identifier. The primary account identifier may be a real or tangible account identifier and thus may be tied to an actual issuer account and may be used by the issuer to identify the account and may not merely include another substitute account identifier. Typically, in credit or debit card transactions, a primary account identifier may be stored in Track 1 data and may be transferred to a merchant's access device or point-of-sale (POS) device when a card or other consumer device is swiped at the merchant device. As explained previously, in some embodiments, the primary account identifier may be tokenized, masked, or otherwise substituted during a transaction to generate a payment token that may be registered and substituted during a payment transaction.

A "payment transaction" may include any interaction between a buyer and a seller for a good or service. For example, a payment transaction may include a consumer initiating a transaction at a merchant website through a user computer or may include a consumer completing a purchase at a merchant's physical brick and mortar storefront. For example, a retail payment transaction may include a payment transaction that is initiated at a merchant or through a merchant access device (e.g., point-of-sale device). For example, a retail payment transaction may include transactions that are initiated by a consumer using a portable consumer device (e.g., credit or debit card) while shopping at a merchant's brick and mortar storefront or other physical location.

Operations that occur during a payment transaction may include any operations, steps, methods, or other activity that may occur after the initiation of a payment transaction and before a merchant receives confirmation or authorization to complete a transaction with a consumer. For example, during typical transaction processing, a consumer may initiate a transaction by swiping their payment device at a merchant access device which may generate an authorization request message that may be transferred through a payment transaction processing system in order for a payment to be processed, as will be described in further detail below. Any actions that occur after a transaction has been initiated and an authorization request message has been generated but before a merchant receives an authorization response message from an issuer associated with the consumer, may be considered as being during a payment transaction. A mobile payment transaction may include a payment transaction that is initiated by a consumer using a mobile device. For example, a consumer may initiate a transaction using a mobile communication device that is configured to complete transactions using accounts stored on digital wallets and communicates with a merchant's access device via near-filed communication (NFC) or other communication standard. A purchase transaction can be an electronic transaction involving a user, such as a consumer, and a merchant, where the user purchases an item or service from the merchant. An example includes a consumer making an online credit-card purchase on a merchant website.

Operations that occur after a payment transaction may include any operations, steps, methods, or other activity that may occur after the completion of a payment transaction and thus after the merchant receives authorization of a payment transaction. As explained above, in some embodiments, an issuer associated with a consumer may generate and transfer an authorization response message through a payment transaction system. The authorization response message may include an indication as to whether a transaction is authorized.

An "authorization request message" may be an electronic message that is sent to a payment processing system, a payment processing network, and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to identification information including, by way of example only: a service code, a CVV (card verification value), a dCVV (dynamic card verification value), an expiration date, etc. An authorization request message may also comprise any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network or system. The authorization response message may include, by way of example only, one or more of the following status indicators: Approval—transaction was approved; Decline—transaction was not approved; or Call Center—response pending more information, merchant may call the toll-free authorization phone number. The authorization response message may also include an authorization code, which may be a code that an account issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "hosted order page" (HOP) is a third-party hosted webpage that accepts payment information from customers on behalf of merchants. A merchant website typically redirects a customer to a HOP on the third-party's domain/server when the customer selects a 'Buy' or 'Checkout' button from an online shopping cart. Once at the HOP, the customer inputs payment information, such as credit card information. The third-party, which is neither the merchant nor the customer, uses the payment information entered by the customer to process the payment transaction for the merchant so that the merchant can avoid handling the customer's payment information, and thereby avoid the cost and effort of complying with the PCI DSS and government regulations regarding storing sensitive payment information.

An "order form" can be a secure acceptance order form in a HOP. Order form can include one or more fields for receiving payment information for a transaction. The fields can include a name, an address, an account number, or any other information included in payment information received from a payment device.

A "silent order post" (SOP) is akin to a HOP but with only the sensitive textboxes and other input controls being hosted by the third party. That is, the merchant hosts the order page but the sensitive fields, such as the credit card number and expiration date entry textboxes, are posted only to the third party's servers.

"Order information" may include information about an electronic transaction, such as information about the item(s) to be purchased, payment amounts, sales tax, shipping address, shipping type (e.g., overnight, one-day, standard), carrier, shipping & handling costs, special requests (e.g., gift wrapping), etc. It may also include information about the consumer making the transactions, such as name, address, email address, purchase history, profile information, and any other information that may be used to measure the level of risk associated with the electronic transaction.

"Payment information" or "payment data" may include information associated with financial accounts, such credit-card accounts, debit-card accounts, demand accounts (e.g., checking accounts, money market accounts), prepaid accounts, eWallet accounts, etc. Examples of such information include payment account numbers ("PANs"), expiration dates, bank routing numbers, checking account numbers, etc.

A "merchant service provider" can be any entity that provides services in support of electronic transactions. Examples of such services include using HOPs and/or SOPs to collect payment information and/or order information and using that information to process purchase transactions and/or evaluate fraud risk in purchase transactions. A merchant service provider may include both a payment service and a fraud detection service.

An "issuer" can refer to a business entity (e.g., a bank or other financial institution) that maintains financial accounts for the user and often issues a payment device such as a credit or debit card to the user.

A "merchant" can refer to an entity that engages in transactions and can sell goods or services to the user or consumer.

An "acquirer" can refer to a business entity (e.g., a commercial bank or financial institution) that has a business relationship with a particular merchant or similar entity. Some entities can perform both issuer and acquirer functions.

A "reader device" can refer to a data input device that reads data from a storage medium or a payment device. The storage medium can include a card-shaped storage medium. The card-shaped storage medium may include a payment device. A payment device may be a debit card, credit card, smart card, mobile device containing a contactless chip, computer, or other suitable form of device. The data input device can be an electronic device that can read a payment device or plastic cards embedded with either a barcode, magnetic strip, computer chip or another storage medium.

"Activation information" can include a uniform resource locator (URL) identifying the location of HOP. The HOP can be located in storage accessible at a merchant service provider. The activation information may enable a computing device to operate a reader device to receive payment information.

FIG. 1 shows a block diagram illustrating a computing system 100 according to one embodiment of the present invention. For example, computing system 100 of FIG. 1 shows a computing device that can operates a mobile point of sale terminal. Specifically, computing system 100 shows a computing device that can function as a mobile POS in a merchant store to obtain payment information via a card reader device and to communicate the payment information via a HOP to a merchant service provider for payment processing.

FIG. 1 depicts a consumer 102, a computing device 112, a merchant system 120, a merchant service provider 130 (e.g., third party service provider), an acquirer 140, a payment processing system 150, a payment processing network 160, and an issuer 170, communicatively connected, such as via a communications network. The communication network may include a cellular network, the Internet, or other type of communication network.

Consumer 102 is, generally, any entity that is a purchaser of products or services via an electronic transaction. Non-limiting examples include a person or business entity that purchases or licenses goods and services from merchants via the public Internet or at a retail store using a credit card, debit card, e-check, etc.

Merchant 110 is, generally, any entity that offers goods or services in exchange for value. Merchant 110 can represent a merchant physical store location where computing device 112 can be operated by consumer 102 to conduct a transaction for goods or services.

Computing device 112 can include a client or user device, or any suitable form convenient for use by a user. For example, computing device 112 may be a personal digital assistant (PDA), a tablet computer, a laptop computer, a desktop computer, a wearable computer, a kiosk, or any other electronic device capable of communicating with merchant system 120. Computing device 112 can operate as a POS device, a consumer's communication device, or any other device that is capable of communicating payment information to merchant service provider 120 associated with services such as payment processing. A reader device 104 can be communicatively coupled to computing device 112. Computing device 112 can include one or more processor and one or more memory devices including executable instructions that cause the one or more processors to performs operations described herein.

Crypto service 180 is communicatively coupled to reader device. Crypto service 180 can be a third party service provider (e.g., Visa®) that provides security information to reader device 104. Crypto service 180 can provide security services for supporting security features for payment processing and payment authentication applications and processes.

In some embodiments, crypto service 180 can include one or more hardware security modules (HSMs), such as HSM 182. HSM 182 can be a physical computing device that protects and manages digital keys for authentication and provides crypto-processing functionality that secures decrypted data. HSM 182 can store one or more digital security keys, such as key 184. HSM 182 can provide cryptographic security information to reader device 104 using a key management scheme. One key management scheme can include DUKPT. Using DUKPT, crypto service 180 can stored a unique key on reader device 104. The unique key can be derived from a fixed key. The reader device 104 can be configured to encrypt payment information specific to a transaction. The reader device 104 can encrypt payment information by deriving a unique key for a transaction. The unique key is generated based on a fixed key provided by crypto service 180. To reduce a merchant involvement in handling security information and sensitive payment information, reader device 104 may be preloaded with security information, such as a fixed key for DUKPT, for use by reader device 104. In some embodiments, computing device 110 can be configured as a PCI DSS compliant device. Merchant 110 can receive computing device 110 from a third party provider that configures the computing device for PCI DSS compliance. This further enables merchant 110 to avoid costs associated with PCI DSS compliance. Use of a reader device 104 in conjunction with a PCI DSS compliant device can enable merchant 110 to operate computing device 110 in a secure manner for payment processing.

Computing device 112 can operate as a mobile POS terminal to enable consumer 102 to purchase goods or services from merchant 110. Merchant webpages(s) 106 of a merchant website 122 can be presented at computing device 112. The merchant website 122 can be hosted by merchant system 120. Computing device 112 can communicate with merchant system 120 to present webpages, such as webpage 106, for merchant website 122 hosted at merchant system 120. The consumer 102 can communicate with merchant 110 via computing device 112. Communications can include transactions initiated via merchant webpage 106. As part of a purchasing process, certain information is collected from the consumer 102 by the merchant 110 via computing device 112. Non-limiting examples of information collected from the consumer 102 include information about the item to be purchased, payment information, shipping address, and whether the consumer wants to create an account with the merchant. Merchant 110 can collect payment information via card reader device 104 operated by computing device 112. However, some merchants may opt to not collect payment information, such as credit or bank card payment account numbers. For example, some merchants opt not to collect payment information because merchants want to avoid the costs associated with PCI compliance. Operation of computing device 112 is described further in detail below.

Once various transaction and customer-related information is collected by computing device 112, computing device 112 can transmit at least a portion of the information to merchant service provider 130, such as CyberSource® or Authorize.Net®. Additional information may be transmitted along with the information described. For example, merchant 110 may transmit customized data or a specification of merchant service provider's 130 services to apply, or to ignore, in the electronic transaction processing that is provided by the service provider 130. Any or all of the information referenced above, which is transmitted from the merchant 110 to the service provider 130, or vice versa, can be transmitted through a network in any suitable protocol or communication session. A communication session can be initiated via merchant webpage 106. The communication session can enable presentation of a HOP 134. The HOP 134 can be an end-to-end-encrypted (E2EE) HOP. An example of a suitable protocol is Secure Sockets Layer (SSL).

Computing device 112 can include an acceptor module 108 that handles acceptance of payment information from reader device 104. Acceptor module 108 can be a native application, which can be tailored to a specific merchant commerce system, to enable interaction between computing device 112, merchant system 120, and merchant service provider 130. Implementation of acceptor module 108 merchant's 110 computing device enables merchant 110 to avoid involvement in secure payment transaction processing and eliminates costs associated with PCI DSS that can be incurred if merchant handles payment information. Acceptor module 108 can contain configuration information to present a custom interface for initiating operation of reader device 104 for merchant 110. Acceptor module 108 can operate in response to information such as activation information received from merchant service provider 130. In response to receiving encrypted payment information from reader device 104, acceptor module 108 can communicate with merchant service provider 130 to provide the payment information via HOP 134.

Merchant system 120 can be communicatively coupled to computing device 112. Merchant system 120 can include one or more server computers to process and manage retail transactions for merchant 110. As used herein, a "server computer" is typically a powerful computer or cluster of computers. For example, the server computer can be a large mainframe, a minicomputer cluster, or a group of servers functioning as a unit. In one example, the server computer may be a database server coupled to a Web server. Merchant system 120 can present information about goods or services via a merchant webpage 106. Merchant system 120 can host a merchant website 122. One or more webpages, such as webpage 106 can be generated by merchant system 120. Webpages of merchant website 122 can be accessed and viewed by computing device 112. The webpage 106 can present a function for initiating purchase, such as a checkout now ("checkout now") function. Such function can enable merchant system 120 to communicate a session request to establish a communication session between computing device 112 and merchant service provider 130.

The merchant service provider 130 performs one or more services in relation to the electronic commercial transaction associated with transmitted information for a payment transaction. Merchant service provider 130 can include one or more server computers, such as a gateway server computer 132, which operate to perform functions described as being performed by merchant service provider 130. Merchant service provider 130 may be a third party other than the consumer 102, merchant 110, and merchant system 120. Merchant service provider 130 can provides services in support of electronic transactions. Non-limiting examples of such services include services related to payment acceptance processing (e.g., HOP and SOP), credit card authorization, payment information tokenization, risk evaluation and management, fraud screening, tax calculation, export compliance verification, delivery address verification, Internet and/or e-mail address verification, payment crediting, billing, and the like. Merchant service provider 130 can invoke service features of other service providers in support of their service offerings. Merchant service provider 130 can function as a hosted service system that acts as a "host" to host services for a client, merchant 110.

Gateway server computer 132 can function as HOP service provider that provides the HOP 134 to computing device 112. In some embodiments, gateway server computer 132 can store merchant configuration data 136 specific to a merchant, such as merchant 110. Merchant configuration data 136 can include one or more acceptance configurations identifying a mechanism for accepting payment information from consumer 102. Acceptance configuration can include a merchant specific HOP 134 that is configured to accept payment information from computing device 112 for merchant 110. Merchant configuration data 136 can include activation information that is specific to a merchant. The activation information can include a URL identifying the location of HOP 134. The HOP can be located in storage accessible from merchant service provider 130. The activation information may enable acceptor module 108 to operate reader device 104 to receive payment information for acceptance via HOP 134. Merchant configuration data 136 may include information specification for establishing a communication session with computing device 112. Merchant configuration data can store different activation information for each of a plurality of webpages. Each webpage can be associated with a distinct merchant of a plurality of merchants.

Merchant service provider 130 can be communicatively coupled to payment processing system 150. Merchant service provider 130 can communicate with payment processing system 150 to perform security functions on encrypted payment information received via HOP 134. An authorization request can be communicated from merchant service provider 130 to payment processing system 150 to request authorization for a payment transaction based on payment information. Payment processing system 150 can be called by merchant service provider 150 to establish account information for consumer 102. Merchant service provider 150 can call payment processing system 150 to tokenize payment information and stores a payment token that results from the tokenization associated with a user account. Merchant service provider 130 can assemble a tokenization request using data from HOP 134. The tokenization request can be transmitted to the payment processing system 150.

Merchant service provider 130 communicates with merchant system 120 to establish a communication session between merchant service provider 130 and computing device 112 for merchant 110. Merchant system 120 can be called from merchant service provider 130 to provide notification of payment processing for transaction conducted through HOP or SOP via checkout 126.

Payment processing system 150 can include a decryption module 158 to perform decryption of encrypted payment information received from merchant service provider 130. Payment processing system 150 can communicate with crypto service 180 via communication connection 186 to receive security information, such as a fixed key for performing decryption using DUKPT key management. The key can correspond to a key provided to reader device 104 by crypto service 180. This enables point to point encryption from receipt of payment information from reader device 104 to payment processing system 150 where payment information can be decrypted. In some embodiments, decryption module 158 can communicate with crypto service 180 to decrypt payment information received from reader device 104.

Payment processing system 150 can include a tokenization module 154 to tokenize payment information and stores a payment token that results from the tokenization associated with a user account. Account identifiers (e.g., payment account numbers) can be converted to tokens. The tokenization process can generate an account token that masks a true account number or other sensitive information. By using the token, the merchant can satisfy the PCI DSS security guidelines, since the stored token could be stolen without compromising the security of the true account number. The account token can be considered a tokenized account identifier but the tokenization can be accomplished by applying any suitable tokenization algorithm, scheme, or process, as one of ordinary skill would recognize.

Payment processing system 150 can include a payment module 152 to process payment information received from reader device 104 as described herein. Payment module 152 can perform functions that include participation in a clearance and settlement process that are part of overall transaction processing. Payment processing system 150 can communicate and transfer data, such as payment information, to payment processing network 160. Payment processing system 150 can communicate payment information to payment processing network 160 via an intermediary such as acquirer 140. Payment processing network 160 can handle processing of payment information. Decision manager 156 in payment processing system 150 can provides fraud management operations, and rules and decisions system to assess fraud.

Payment processing system 150 communicates with acquirer 140 (which manages merchant accounts) as part of the overall authentication or authorization process. Payment processing system 150 and/or acquirer 140 provide data to payment processing network 160, which, among other functions, participates in the clearance and settlement processes that are part of the overall transaction processing.

Payment processing network 160 can include data processing subsystems, networks, and operations used to support and deliver authorization services, exception file services, and clearing and settlement services. For example, the payment processing network 160 can comprise a server computer and databases of information. An exemplary payment processing network can include, for example, VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 160 can use any suitable wired or wireless network, including the Internet. Among other functions, payment processing network 160 may be responsible for ensuring that a consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

Issuer 170 receives communications from payment processing network 160 for authentication or authorization, where issuer 170 can be an entity that issued the payment device to consumer 102 and manages the consumer's account. Issuer 170 can receive an authorization request message requesting authorization of a payment transaction. Issuer 170 sends an authorization response message to the payment processing network 160 to indicate whether or not the current transaction is authorized. Issuer 170 facilitates posting a transaction to a consumer's account and reconciling the consumer's settlement position.

An example will now be provided with reference to the encircled reference numerals 1-6 provided in FIG. 1. It should be appreciated that the encircled reference numerals are provided for illustrative convenience and are not intended to limit ways in which data may flow or the order in which operations or processes may be executed in system 100. For example, data may flow to and from any component of the system 100 in any order. This example will be discussed with reference to FIGS. 4-8.

This example begins with the consumer 102 visiting a merchant 110 (e.g., a physical store of a merchant). The consumer 102 decides to purchase a service or a good while visiting the merchant 110. Consumer 102 can easily purchase the service or good by interacting with a mobile kiosk or mobile POS terminal, such as computing device 112. This can improve customer experience for the consumer 102 by enabling the consumer 102 to immediately conduct a purchase without having to wait in line. Interacting with the computing device 112, merchant navigates a merchant website 122 hosted by merchant system 120. Navigating the merchant website 122, consumer can view a merchant webpage 106 that provides details for a particular good or service. Webpage 106 provides a summary of order information 312, which may include, for example, an order number, customer information, item information (e.g., SKU data), etc.

Now referring to encircled reference numeral 1 of FIG. 1, the webpage 106 provides an interface or view 126 (e.g., "checkout now" webpage) that includes an button (e.g., "checkout now" or "pay now" button) to initiate purchase of the good or service. The interface 126 may include an IFrame (e.g., "checkout now") page. IFrame 124 may include a webpage, such as HOP 134 that is personalized for the merchant, but hosted by a third party, such as merchant service provider 130. Selection of the "checkout now" button causes computing device 112 to initiate a request to merchant system 120 to initiate a payment transaction for purchase of a good or a service between a merchant and a consumer.

Continuing at numeral 1, merchant system 120 communicates a session request to establish a session for communication with a merchant POS terminal, such as computing device 112, to conduct a payment transaction between a merchant and a consumer. The session request is communicated in response to receiving the request to initiate a payment transaction.

Any or all of the information referenced above, which is transmitted from the merchant 110 to the service provider 130, or vice versa, can be transmitted through a network in any suitable protocol or communication session. The communication session can enable presentation of a hosted order page (HOP) 134. The communication session enables secure communication between a merchant via computing device 112 and merchant service provider to conduct a payment transaction.

At numeral 2, in response to the session request, merchant service provider 130 establishes a communication session with computing device 112. Via the communication session, merchant service provider 130 sends activation information to the computing device 112. The activation information identifies a location of a webpage on the gateway server computer 132. For example, the activation information may include a URL identifying the location of a webpage in merchant configuration data 136. The merchant configuration data 136 can include merchant specific HOPs, such as HOP 134 that can be presented at computing device 112. The activation information may trigger, or cause acceptor module 108 to become activated. Acceptor module 108 can display the webpage identified by the URL in response to receiving the activation information. Acceptor module 108 can include a webview controller that can provide a secure acceptance webpage, such as HOP 134 identified by URL in activation information. The webpage can be displayed in computing device 112 and may include a prompt to initiate operation of the reader device 104 to receive payment information.

The webpage enables operation of a reader device to receive payment information. For example, the webpage can include a control (e.g., "swipe now" button) that enables the consumer to operate reader device 104 to provide payment information for a transaction initiated via webpage 106. The HOP 134 can include the control to enable operation of the reader device 104. In some embodiments, receipt of the activation information can cause the acceptor module 108 to operate a toolbar controller in the acceptor module 108 that presents a graphical interface at the computing device 112 to enable operation of the reader device 104. The graphical interface can provide an override for use of the webpage identified by the activation information.

Acceptor module 108 requests encrypted payment information from reader device 104. in response to operation of a control on a webpage identified in the activation information. Acceptor module 108 receives payment information from the reader device in response to input received via the webpage. The input received via the webpage can correspond to an interaction with a control on the webpage identified by the URL in the activation information. The payment information can be encrypted. In some embodiments, the payment information is encrypted using a key stored in the reader device 104. The key can be provided by crypto service 180. The payment information can be encrypted with a unique key using a DUKPT key management mechanism based on a key received from crypto service 180. This ensures that the payment information is securely communicated from reader device 104 to payment processing system 150 where it can be decrypted. Because payment information is encrypted dynamically with a derived key, future and past transaction data cannot be compromised since the next or prior keys cannot be determined easily without the fixed key.

At numeral 3, acceptor module 108 inserts, or "injects," the encrypted payment information into an order form of the webpage identified by the activation information. The webpage can be HOP 134. After insertion of the payment information, the acceptor module 108 can execute the order form (without interaction from consumer 102 or merchant 110) to cause the payment information to be submitted to the gateway server computer 132 for payment processing. The payment information can be submitted by executing a post function call on the order form of the webpage. It should be noted that, in the illustrated example, the payment information is transmitted via an SSL pipe in a communication session from the computing device 112 to the merchant service provider 130 and bypasses the merchant system 120 altogether. Thus, the merchant 110 does not handle the payment information and therefore does not have to be PCI compliant. Gateway server computer 132 can receive the encrypted payment information (e.g., encrypted payload) via the order form in response to execution of the post function call. The payment information can be processed as a "card not present" transaction to payment processing system 150.

At numeral 4, gateway server computer 132 sends a decrypt request to the payment processing system to decrypt the encrypted payload. In a particular embodiment, gateway server computer 132 can decrypt the encrypted payload. Similar to the payment processing system 150, gateway server computer 132 can obtain a key (e.g., DUKPT key) from crypto service 180 to decrypt the encrypted payload. The encrypted payload is decrypted by the decryption module 158 and a decryption result is communicated back to gateway server computer 132.

At numeral 5, gateway server computer 132 can send an authorization and tokenization request to payment processing system 150. The authorization request can include a request for authorization of the payment transaction and a request for tokenization for the consumer 102. Payment processing system 132 can tokenize payment information and store a payment token that results from the tokenization associated with a user account. Payment module 152 can use payment token to process payment for the payment transaction conducted via computing device 112. The payment module 152 can determine if the transaction should be authorized. In some embodiments, payment processing system 150 can communicate payment information to payment processing network 160 via an intermediary such as acquirer 140 to perform tokenization and conduct payment processing. An authorization response message is communicated is communicated back to the gateway server computer 132.

In a particular embodiment, gateway server computer 132 can access the merchant configurations data 136 to determine whether the merchant 110 has enabled fraud detection services. If the merchant 110 has enabled fraud detection services, then payment processing system 150 executes the decision manager 156 to perform fraud detection services to run the payment information as well as the order information through a plurality of fraud detection algorithms to assess the risk associated with the transaction and to provide an approve/deny indication. After the decision manager 156 provides the approve/deny indication, the assessment of the risk can be communicated with an authorization result (e.g., an authorization response message) communicated to the merchant service provider 130.

At numeral 6, merchant service provider 130 sends to the merchant system 120 a notification of a payment result of processing the payment transaction. The notification of the payment result can be a postback that indicates a result of the payment transaction. Merchant service provider 130 also sends to the computing device 112 the payment result (e.g., order confirmation) of the processing the payment transaction.

Figure 2:
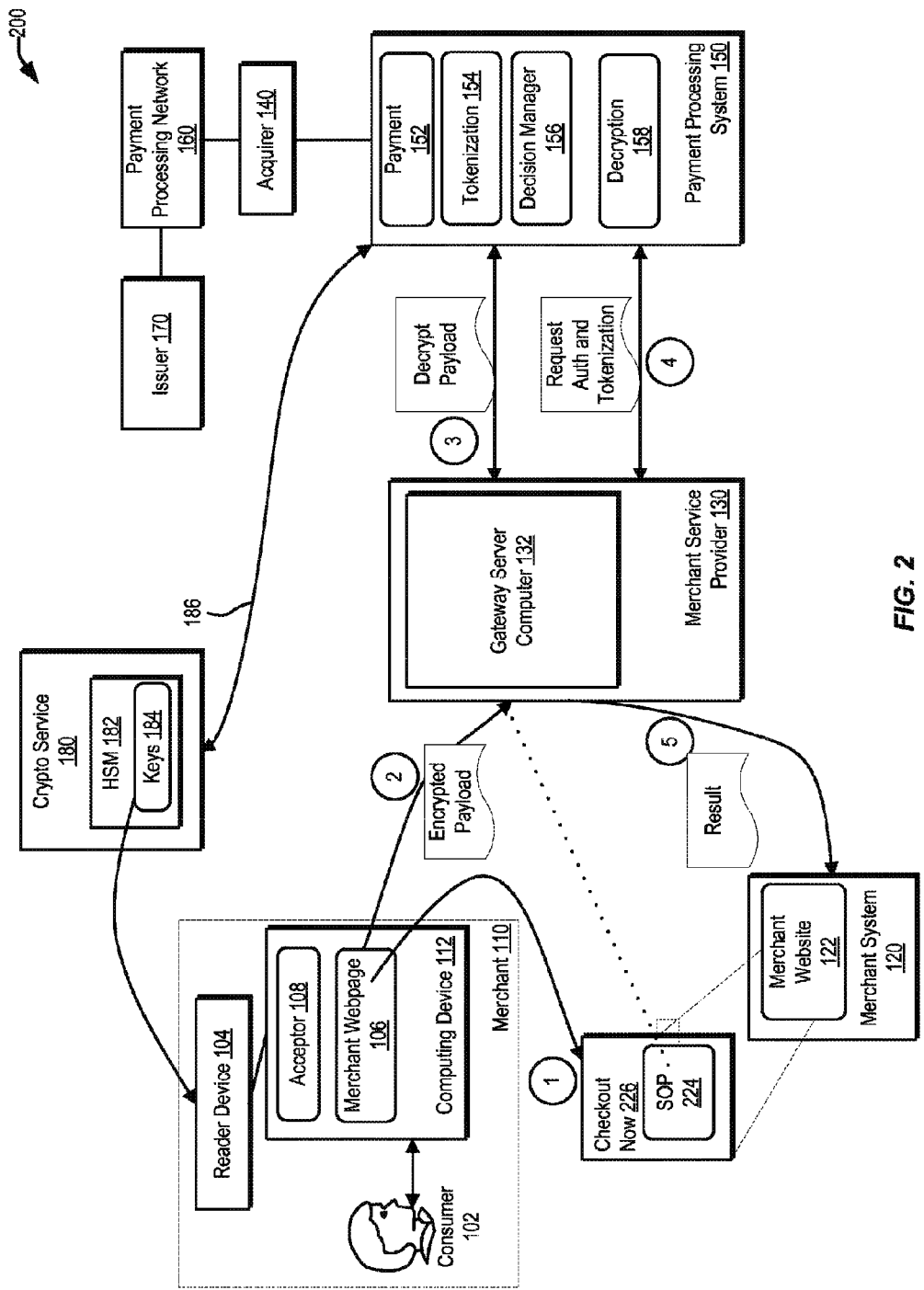
FIG. 2 is a block diagram illustrating a computing system according to one embodiment of the present invention.

FIG. 2 is a block diagram illustrating a computing system 200 according to one embodiment of the present invention. FIG. 2 shows a computing device that can function as a mobile POS in a merchant store to obtain payment information via a card reader device and to communicate the payment information via a SOP to a merchant service provider for secure payment processing. Computing system 200 can function similarly to computing system 100; however in this embodiment, payment information received from reader device 104 is processed through a SOP. In this embodiment, merchant 110 is able to exert more control over customization of user experience on merchant's website 122 for accepting payment information via reader device 104 and providing receipt information.

In a particular embodiment, merchant system 120 can configure merchant's website 122 to present a secure acceptance page that can receive payment information from reader device 104. The secure acceptance page can be hosted by merchant system 120. An example will now be provided with reference to the encircled reference numerals 1-5 provided in FIG. 2. It should be appreciated that the encircled reference numerals are provided for illustrative convenience and are not intended to limit ways in which data may flow or the order in which operations or processes may be executed in system 200. For example, data may flow to and from any component of the system 200 in any order. This example will be discussed with reference to FIG. 2.

This example begins with the consumer 102 visiting a merchant 110 (e.g., a physical store of a merchant). The consumer 102 decides to purchase a service or a good while visiting the merchant 110. As in system 100, consumer 102 can easily purchase the service or good by interacting with a mobile kiosk or mobile POS terminal, such as computing device 112. At encircled reference numeral 1 of FIG. 1, the webpage 106 provides an interface or view 226 (e.g., "checkout now page") that includes an button (e.g., "checkout now" or "pay now" button) to initiate purchase of the good or service. Interaction with the button can cause acceptor module 108 to initiate operation of reader device 104. Selection of the "checkout now" button causes computing device 112 to initiate a request to merchant system 120 to initiate a payment transaction for purchase of a good or a service between a merchant and a consumer. A merchant secure acceptance page is presented in the interface 226. The interface 226 can include a page configured to communication payment via a SOP to merchant service provider 130.

Acceptor module 108 requests encrypted payment information from reader device 104. The payment information can be encrypted using a key stored in the reader device 104. The key can be provided by crypto service 180. The payment information can be encrypted with a unique key using a DUKPT key management mechanism based on a key received from crypto service 180. This ensures that the payment information is securely communicated from reader device 104 to payment processing system 150 where it can be decrypted.

At numeral 2, acceptor module 108 can execute a SOP 224 to cause the received encrypted payment information (e.g., encrypted payload) to be submitted to the gateway server computer 132 for payment processing. To avoid duties with PCI DSS compliance, acceptor module 108 can be provided by merchant service provider 130 that handles secure payment processing and compliance with handling payment information. Using the SOP 224, merchant service provider 130 can enable secure acceptance of encrypted payment information from reader device 104 to merchant service provider 130. Similar to FIG. 1, the payment information is transmitted via an SSL pipe in a communication session from the computing device 112 to the merchant service provider 130 and bypasses the merchant system 120 altogether. Thus, the merchant 110 does not handle the payment information and therefore does not have to be PCI compliant. Gateway server computer 132 can receive the encrypted payment information (e.g., encrypted payload) via the order form in response to execution of the post function call. The payment information can be processed as a "card not present" transaction to payment processing system 150.

Numerals 3-5 can be performed as described with respect to numerals 4-6 in FIG. 1. At numeral 3, gateway server computer 132 sends a decrypt request to the payment processing system to decrypt the encrypted payload. In a particular embodiment, gateway server computer 132 can decrypt the encrypted payload. At numeral 4, gateway server computer 132 can send an authorization and tokenization request to payment processing system 150. The authorization request can include a request for authorization of the payment transaction and a request for tokenization for the consumer. Payment module 152 can use payment token to process payment for the payment transaction conducted via computing device 112. At numeral 5, merchant service provider 130 sends to the merchant system 120 a notification of a payment result of processing the payment transaction and sends to the computing device 112 the payment result (e.g., order confirmation) of the processing the payment transaction.

Figure 3:
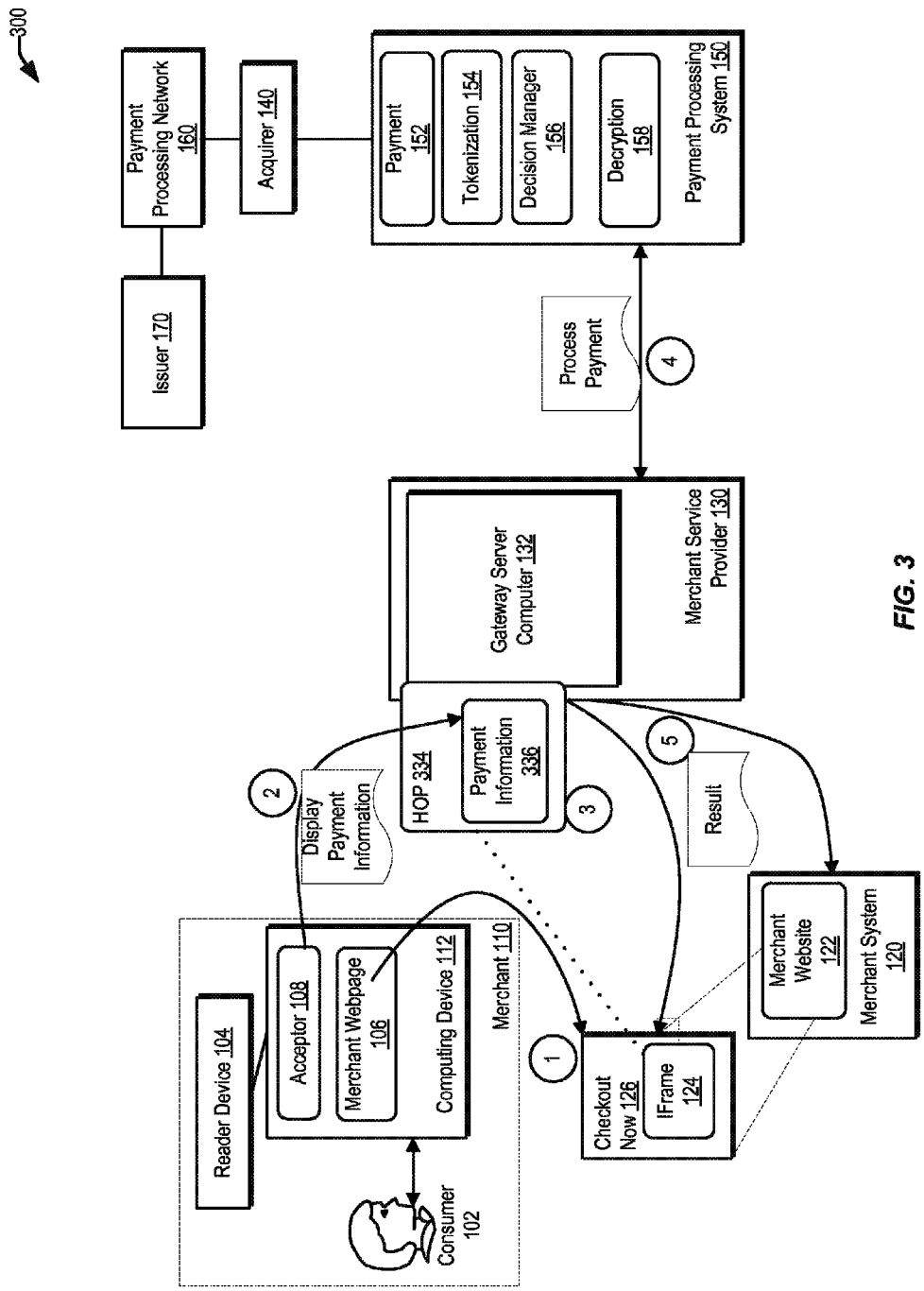
FIG. 3 is a block diagram illustrating a computing system according to one embodiment of the present invention.

FIG. 3 is a block diagram illustrating a computing system 300 according to one embodiment of the present invention. FIG. 3 shows a computing device that can function as a mobile POS in a merchant store to obtain payment information via a card reader device and to communicate the payment information via a HOP to a merchant service provider for secure payment processing. In this embodiment, payment information received from a reader device can be parsed and populated into fields of an order form in the HOP. A user can review and modify the payment information displayed in the HOP. The embodiments described with respect to FIG. 3 improve user experience by enabling customer 102 or a merchant 110 to review payment information received from a reader device to be reviewed before submission to a merchant service provider. The payment information can be submitted via the HOP as a "Card Present" transaction.

Similar to system 100 and system 200, merchant system 120 can configure merchant's website 122 to present a secure acceptance page that can receive payment information from reader device 104. The secure acceptance page can be hosted by merchant system 120. An example will now be provided with reference to the encircled reference numerals 1-5 provided in FIG. 2. It should be appreciated that the encircled reference numerals are provided for illustrative convenience and are not intended to limit ways in which data may flow or the order in which operations or processes may be executed in system 200. For example, data may flow to and from any component of the system 200 in any order. This example will be discussed with reference to FIG. 2.

This example begins with the consumer 102 visiting a merchant 110 (e.g., a physical store of a merchant). A consumer 102 deciding to purchase a service or a good while visiting the merchant 110 interacts with a mobile kiosk or mobile POS terminal, such as computing device 112. At encircled reference numeral 1 of FIG. 1, the webpage 106 provides an interface or view 126 (e.g., "checkout now page") that includes an button (e.g., "checkout now" or "pay now" button) to initiate purchase of the good or service. Interaction with the button can cause acceptor module 108 to initiate operation of reader device 104. Selection of the "checkout now" button causes computing device 112 to initiate a request to merchant system 120 to initiate a payment transaction for purchase of a good or a service between a merchant and a consumer. A merchant secure acceptance page is presented in the interface 226.

Acceptor module 108 requests payment information from reader device 104. The payment information can be encrypted using a key stored in the reader device 104. The key can be provided by crypto service 180. The payment information can be encrypted with a unique key using a DUKPT key management mechanism based on a key received from crypto service 180.

At numeral 2, acceptor module 108 can include code, such as a javascript function, which can parse the payment information to determine one or more fields of information that correspond to one or more fields of HOP 134. The acceptor module 108 will populate one or more fields in the HOP 134 to display payment information 336 in the HOP 134.

At numeral 3, the payment information 336 can be reviewed before it is submitted to the merchant service provider 130. The merchant 110 is able to review, edit, and/or verify the payment information 336 in the order form prior to submission. The merchant 110 has an option to manually enter payment information in the case of unreadable/unparseable payment devices.

Numeral 4 can be performed as described with respect to numerals 4 and 5 in FIG. 1. At numeral 4, in some embodiments, merchant service provider 130 can communicate a request (e.g., a web services request) to payment processing system 150 to process payment for the payment information. The ability to review and revise the field in the order form reduces a risk for conducting the payment transaction. The request can be transmitted to as a "Card Present" transaction, which poses less risk than a standard order submitted through a hosted order webpage. Merchant service provider 130 can receive an authorization result in response to submitting the payment processing request to the payment processing system. At numeral 5, merchant service provider 130 can communicate a notification result to merchant system 120 to indicate a result of the payment processing. Merchant service provider 130 can also communicate a notification result to computing device 112 to provide order confirmation regarding the request to process the payment information.

Figure 4:
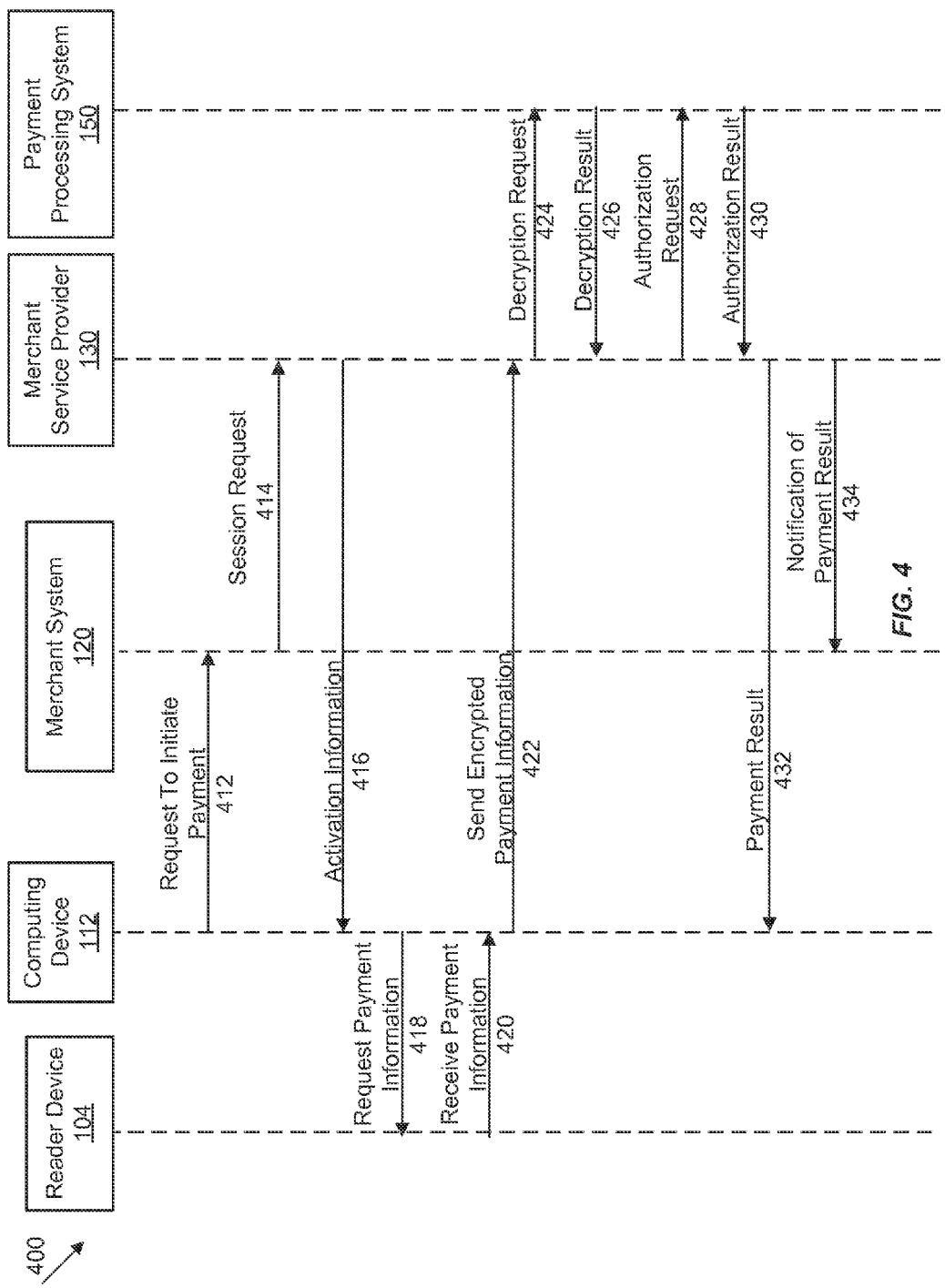
FIG. 4 illustrates a process according to one embodiment of the present invention.

Embodiments described with respect to FIG. 4 enable merchants to leverage their merchant system 120 to facilitate secure acceptance of payment information via a reader device integrated with a computing device (e.g., a POS terminal). In this manner, merchants are not burdened with integrating third party solutions for implementing a reader device. A merchant and a consumer are equally afforded an opportunity to verify payment information before payment information is submitted for processing. A merchant can operate a computing device as a mobile computing device to as a mobile POS terminal at locations that extend beyond a merchant's physical store. For example, consumers can use a mobile POS terminal to conduct payments at home in the presence of an agent for a merchant after a service has been provided. Consumers are less burdened with having to visit a merchant to conduct payment or wait for payment to be verified through mail or web transactions that take additional time.

Referring to FIG. 4, a process 400 is illustrated according to one embodiment of the present invention. Process 400 can be implemented in system 100 of FIG. 1. Process 400 illustrates an example of a payment transaction conducted using a reader device at a computing device, which conducts payment transaction via a HOP provided by a service provider for a merchant.

At step 412, computing device 112 can initiate a request to merchant system 120 to initiate a payment transaction for purchase of a good or a service between a merchant and a consumer. Step 412 can correspond to numeral 1 in FIG. 1. The request can be initiated in response to interaction with a button ("checkout now") in an IFrame 124 presented in a webpage 106 on computing device 112.

At step 414, merchant system 120 communicates a session request to establish a session for communication with a merchant POS terminal, such as computing device 112, to conduct a payment transaction between a merchant and a consumer. Step 414 can be performed as described with respect to numeral 1 in FIG. 1. The session request is communicated in response to receiving the request to initiate a payment transaction.

At step 416, via a communication session established with computing device 112, merchant service provider 130 sends activation information to the computing device 112. Step 416 can be performed as described with respect to number 2 in FIG. 1. The activation information identifies a location of a webpage on gateway server computer 132. For example, the activation information may include a URL identifying the location of a webpage. Acceptor module 108 can display the webpage identified by the URL in response to receiving the activation information. The webpage can be displayed in computing device 112 and may include a prompt to initiate operation of the reader device 104 to receive payment information. The webpage enables operation of a reader device to receive payment information.

At step 418, computing device 112 requests payment information from reader device 104. For example, acceptor module 108 requests encrypted payment information from reader device 104. Acceptor module 108 requests the payment information in response to operation of a control on a webpage identified in the activation information. The request for payment information can be initiated in response to interaction with a control in a graphical interface presented in response to the activation information.

At step 420, computing device 112 receives payment information from the reader device 104 in response to input received via the webpage. The input received via the webpage can correspond to an interaction with a control on the webpage identified by the URL in the activation information. The payment information can be encrypted. In some embodiments, the payment information is encrypted using a key stored in the reader device 104. The key can be provided by crypto service 180. The payment information can be encrypted with a unique key using a DUKPT encryption mechanism based on a key received from crypto service 180.

At step 422, computing device 112 sends encrypted payment information to merchant service provider 130. Step 422 can be performed as described with respect to numeral 3 in FIG. 1. The encrypted payment information received from reader device 104 is inserted into an order form of HOP 134. After insertion of the payment information, the acceptor module 108 executes a post function call on the order form of the webpage. Executing the post function call causes the encrypted payment information to be send to merchant service provider 130. Gateway server computer 132 can receive the encrypted payment information via the order form in response to execution of the post function call.

At step 424, merchant service provider 130 can send a decryption request to the payment processing system to decrypt the encrypted payload. Step 424 can be performed as described in numeral 4 of FIG. 1. In a particular embodiment, gateway server computer 132 can decrypt the encrypted payload. Similar to the payment processing system 150, gateway server computer 132 can obtain a key (e.g., DUKPT key) from crypto service 180 to decrypt the encrypted payload. In some embodiments, the encrypted payload can be communicated via 186 to crypto service 180 to decrypt the encrypted payload.

At step 426, payment processing system 150 can send a decryption result to merchant service provider 130 indicating whether the payment information could be decrypted, process 400 proceeds to steps 432 and 434. At step 428, gateway server computer 132 can send an authorization request to payment processing system 150. The authorization request can include a request for authorization of the payment transaction and a request for tokenization for the consumer. The authorization and tokenization request can be performed as described in FIG. 1 with respect to numeral 5. In some embodiments, the decryption request and the request for authorization can be performed together in a single request to the payment processing system.

At step 432, merchant service provider 130 sends to the merchant system 120 a notification of a payment result of processing the payment transaction. The notification of the payment result can be a postback that indicates a result of the payment transaction. At step 434, merchant service provider 130 sends to the computing device 112 the payment result (e.g., order confirmation) of the processing the payment transaction. An example of a payment result sent to computing device 112 can be seen in FIG. 7.

Figure 5:
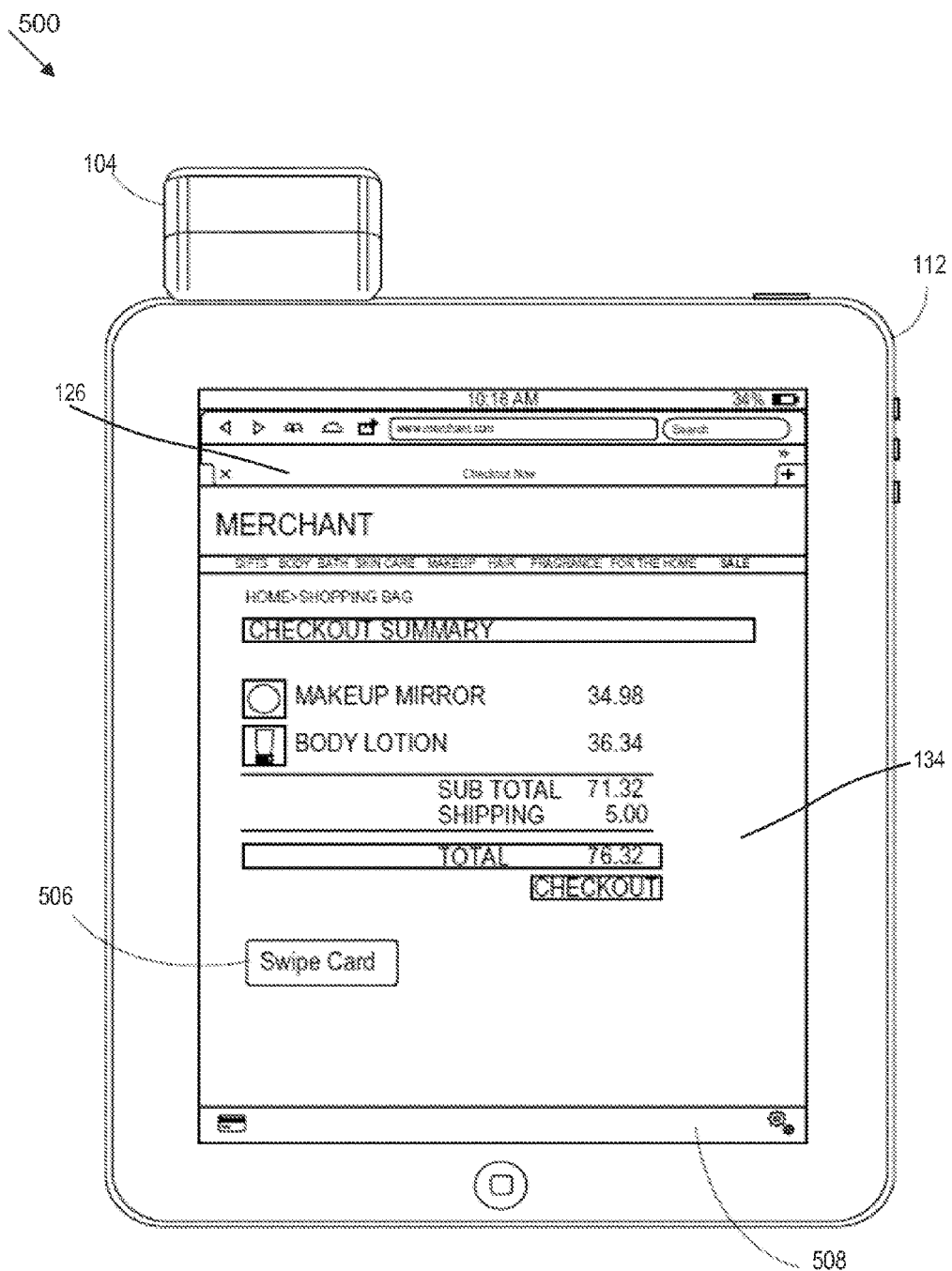
FIG. 5 illustrates a diagram of an exemplary computing device including a reader device according to an embodiment of the present invention.

FIG. 5 illustrates a diagram 500 of an exemplary computing device 112 including a reader device according to an embodiment of the present invention. Computing device 112 is communicatively coupled to reader device 104. Reader device 104 can be an electronic device at attaches to computing device 112. In FIG. 5, computing device 112 presents HOP 134 in merchant web page 126. HOP 134 can be identified by a URL provided in activation information sent from gateway server computer 132 to computing device 112. HOP 134 can include one or more interactive controls such as control 506 ("swipe now") that initiates operation of reader device 104. HOP 134 can display order information, such as product purchased, itemized purchase prices, and cost information. In some embodiments, acceptor module 108 can present a graphical interface that includes a toolbar 508 with one or more interactive controls for operation of reader device 104. Interaction with interactive control 506 or toolbar 508 can enable initiation of reader device 104.

Because HOP 134 can be located at gateway server computer 132, HOP 134 can be used from computing devices, such as computing device 112, which are able to communicate with merchant system 120 to cause activation information to be sent to the computing devices. Reader device 104 can be configured to operate in conjunction with HOP 134, such that the computing device 112 may not be usable with reader device 104 when computing device 112 does not have receive HOP 134. Thus, embodiments herein can be configured as a system for operation with a merchant system.

Figure 6:
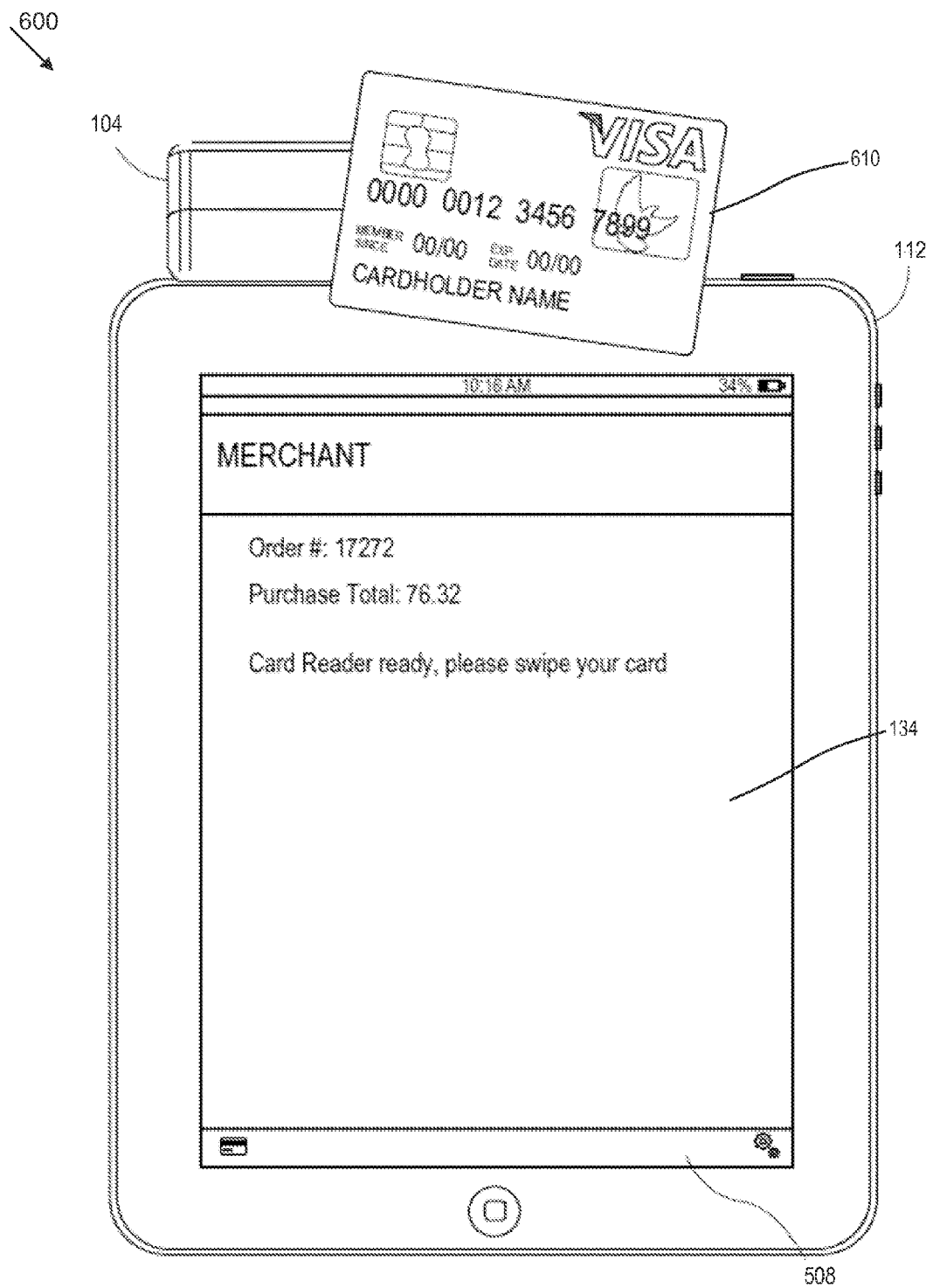
FIG. 6 illustrates a diagram of an exemplary computing device including a reader device according to an embodiment of the present invention.

FIG. 6 illustrates a diagram 600 of an exemplary computing device 112 including a reader device according to an embodiment of the present invention. In FIG. 6, HOP 134 is updated to present order information and provide one or more interactive controls to further initiate operation of reader device 104. Reader device 104 can communicate or receive a payment device 610 (e.g., a credit card or a debit card) to receive payment information. The reader device can include a driver that captures the payment information transmitted from the payment device and encrypts the payment information using a key loaded on reader device 104 by crypto service 180.

Figure 7:
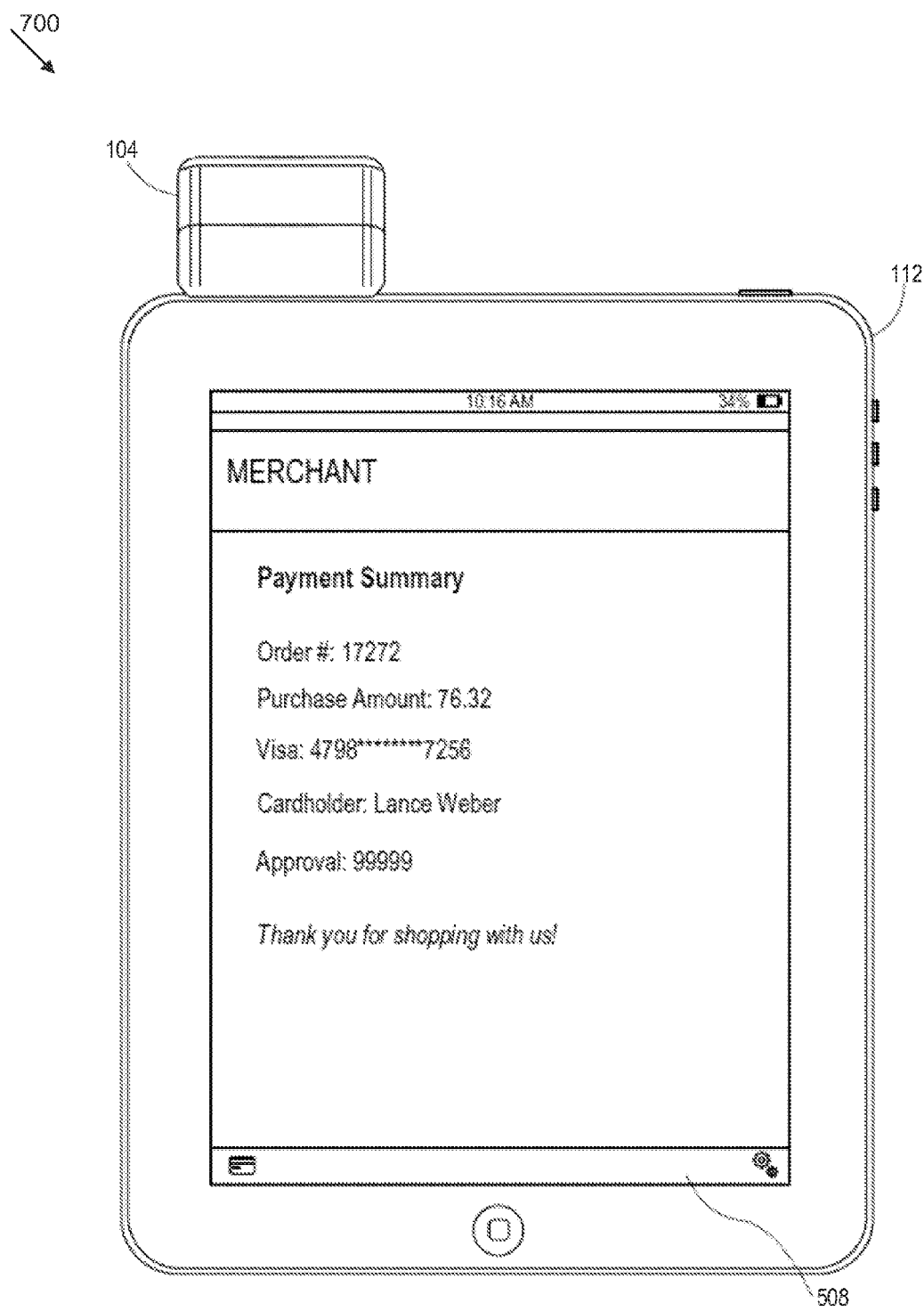
FIG. 7 illustrates a diagram of an exemplary computing device including a reader device according to an embodiment of the present invention.

FIG. 7 illustrates a diagram 700 of an exemplary computing device 112 including a reader device according to an embodiment of the present invention. Diagram 700 illustrates an order confirmation that is displayed in the computing device 112 in response to the computing device 112 receiving a notification result from merchant service provider for processing payment information. The notification result can include order confirmation information such as a receipt of payment.

Figure 8:
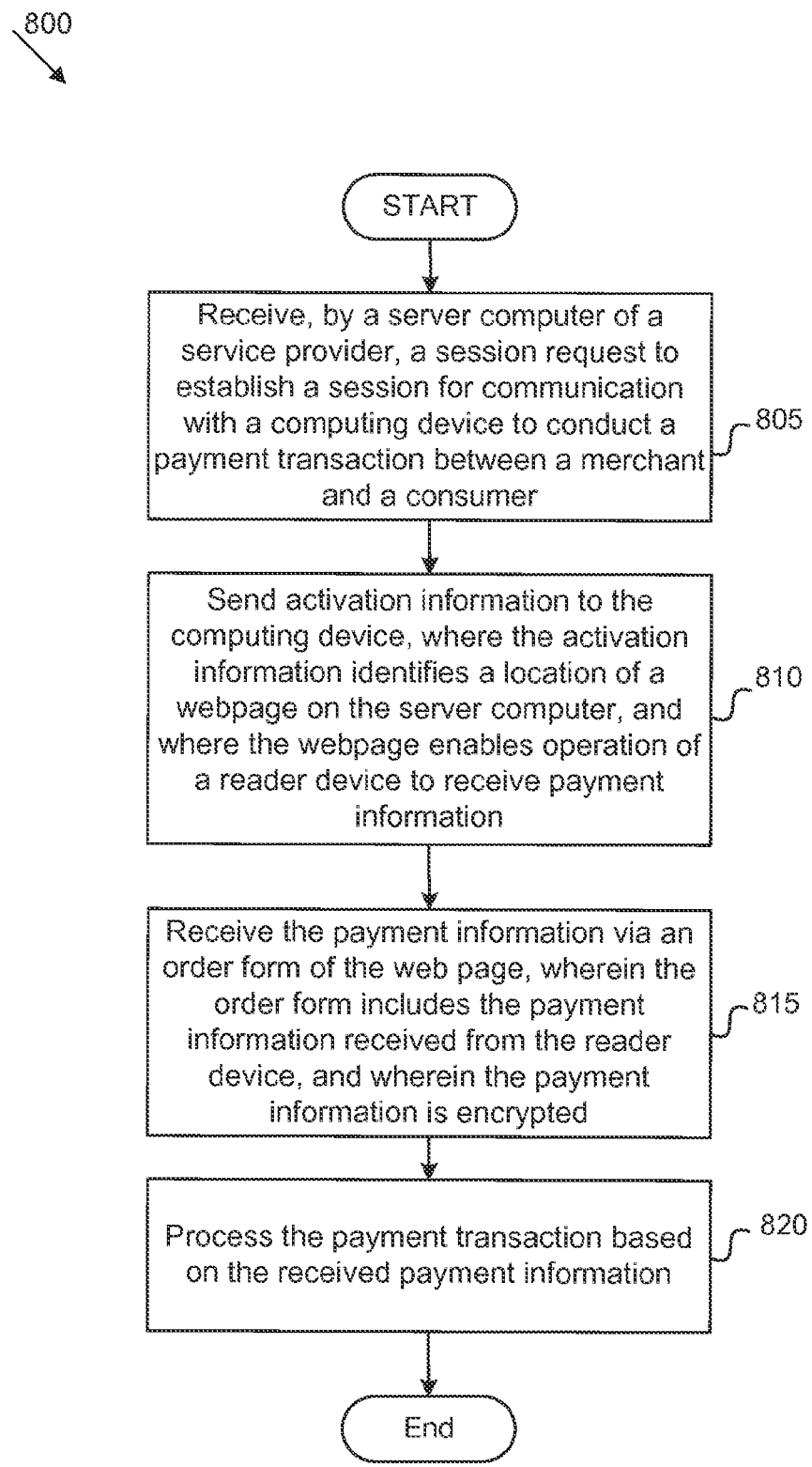
FIG. 8 is a flow diagram of an exemplary process according to an embodiment of the present invention.

Now turning to FIG. 8, a flow diagram of an exemplary process 800 according to an embodiment of the present invention. Process 800 can be implemented by merchant service provider 130 of FIG. 1. In particular, gateway server computer 132 can perform process 800.

At block 805, process 800 receives a session request to establish a session for communication with a computing device to conduct a payment transaction between a merchant and a consumer. For example, merchant service provider 130 receives a session request to establish a session for communication between merchant service provider 130 and computing device 112. The session request can be communicated in response to receiving a request from computing device 112 to initiate a payment transaction.

At block 810, process 800 sends activation information to the computing device. For example, merchant service provider 130 sends activation information to the computing device 112. The activation information identifies a location of a webpage on a server computer, such as gateway server computer 132. The webpage enables operation of a reader device to receive payment information. For example, the webpage causes acceptor module 108 to become activated to present the webpage. The webpage includes a control labeled "swipe card" that enables operation of reader device 104.

At block 815, process 800 receives the payment information via an order form of the web page. The order form includes the payment information received from the reader device. For example, the encrypted payment information is inserted, or "injected," into an order form of the webpage identified by the activation information. The webpage can be HOP 134. After insertion of the payment information, the acceptor module 108 can execute the order form (without interaction from consumer 102) to cause the payment information to be submitted to the gateway server computer 132 for payment processing. Gateway server computer 132 can receive the encrypted payment information via the order form in response to execution of the post function call. The payment information is encrypted using a key stored in the reader device 104. Encryption can be performed with a unique key using a DUKPT encryption mechanism based on a key received from crypto service 180.

At block 820, process 800 includes processing the payment transaction based on the received payment information. To process payment information, merchant service provider 130 can send a decryption request to the payment processing system 150 to decrypt the encrypted payload using a ley received from crypto service 180. In some embodiments, the encrypted payload can be communicated via 186 to crypto service 180 to decrypt the encrypted payload. Upon receiving a decryption result, merchant service provider 130 can send an authorization and tokenization request to payment processing system 150. The authorization request can include a request for authorization of the payment transaction and a request for tokenization for the consumer.

Figure 9:
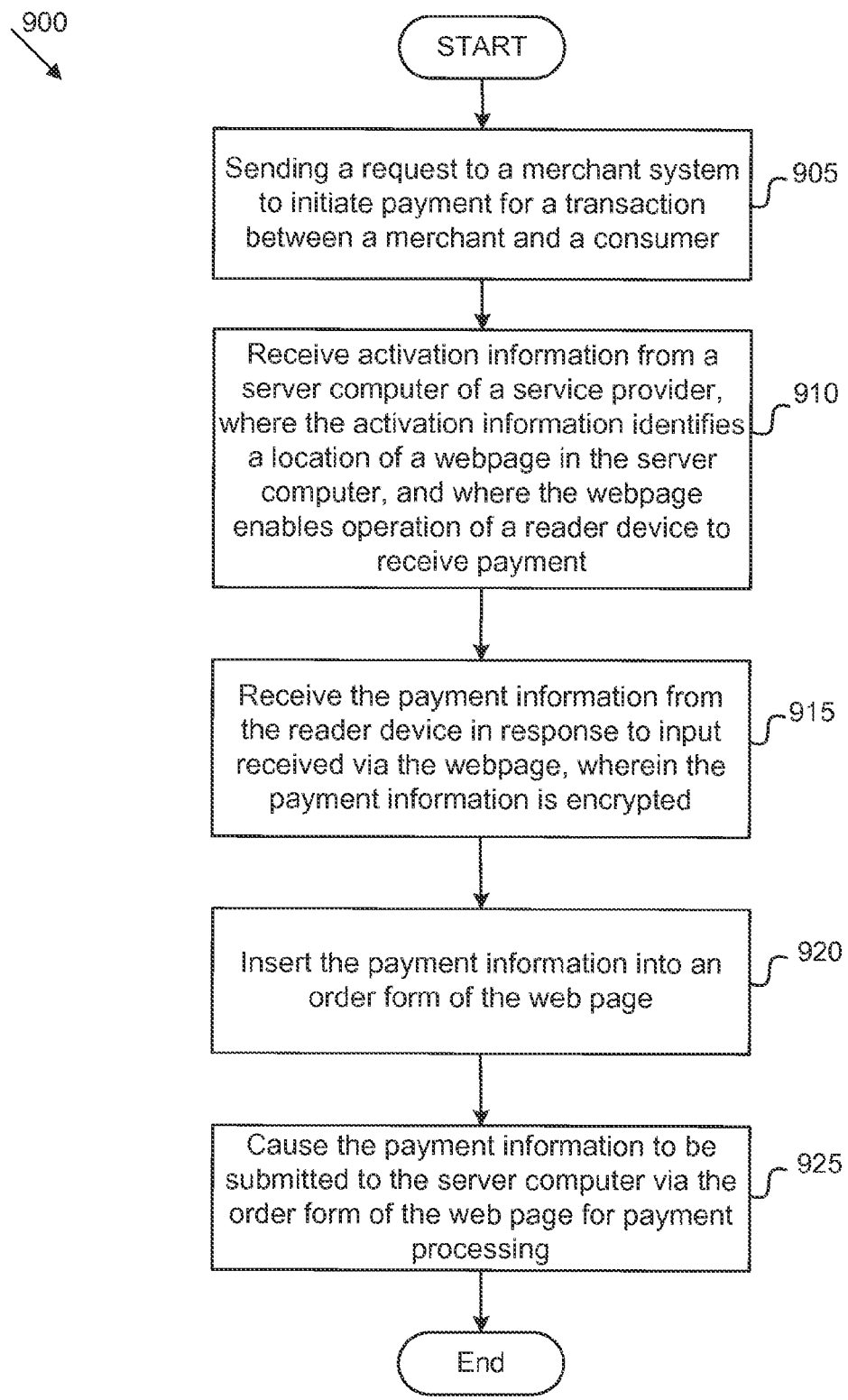
FIG. 9 is a flow diagram of an exemplary process according to an embodiment of the present invention.

Now turning to FIG. 9, an exemplary process 900 is shown according to an embodiment of the present invention. Process 900 can be implemented by computing device 112.

At block 905, process 900 sends a request to a merchant system to initiate payment for a transaction between a merchant and a consumer. For example, computing device 112 can initiate a request to merchant system 120 to initiate a payment transaction for purchase of a good or a service between a merchant and a consumer. The request can be initiated in response to interaction with a button ("checkout now") in an IFrame 124 presented in a webpage 106 on computing device 112 accessed by consumer 102 at merchant 110.

At block 910, process 900 receives activation information from a server computer of a service provider. For example, computing device 112 receives activation information from gateway server computer 132 of merchant service provider 130 of FIG. 1. The activation information identifies a location of a webpage on a server computer, such as gateway server computer 132. The webpage enables operation of a reader device to receive payment information. For example, the webpage causes acceptor module 108 to become activated to present the webpage. The webpage includes a control labeled "swipe card" that enables operation of reader device 104.

At block 915, process 900 receives the payment information from the reader device in response to input received via the webpage. For example, computing device 112 receives payment information from the reader device 104 in response to input received via the webpage. The payment information is encrypted using a key stored in the reader device 104. Encryption can be performed with a unique key using a DUKPT encryption mechanism based on a key received from crypto service 180.

At block 920, process 900 inserts the payment information into an order form of the web page. For example, computing device 112 sends encrypted payment information to merchant service provider 130. The encrypted payment information received from reader device 104 is inserted into an order form of HOP 134. After insertion of the payment information, the acceptor module 108 executes a post function call on the order form of the webpage. Executing the post function call causes the encrypted payment information to be send to merchant service provider 130.

At block 925, process 900 includes causing the payment information to be submitted to the server computer via the order form of the web page for payment processing. For example, after insertion of the payment information, the acceptor module 108 can execute a post function (without interaction from consumer 102) to cause the payment information to be submitted to the gateway server computer 132 for payment processing. Gateway server computer 132 can receive the encrypted payment information (e.g., encrypted payload) via the order form in response to execution of the post function call.

Additionally, as some examples showed in FIGS. 2 and 3, number of changes may be introduced into the flow diagram described above depending on the embodiment of the present invention being implemented. Any other alterations of the processes 400, 800, and 900 described above would be understood by one of ordinary skill and embodiments of the present invention may be used before, during, or after a payment transaction and where a requestor can include a computing device 112, a merchant system 120, a merchant service provider 130, a payment processing system 150, an acquirer 140, a payment processing network 160, an issuer 170, or any other entity within system 100, system 200, and system 300.

Figure 10:
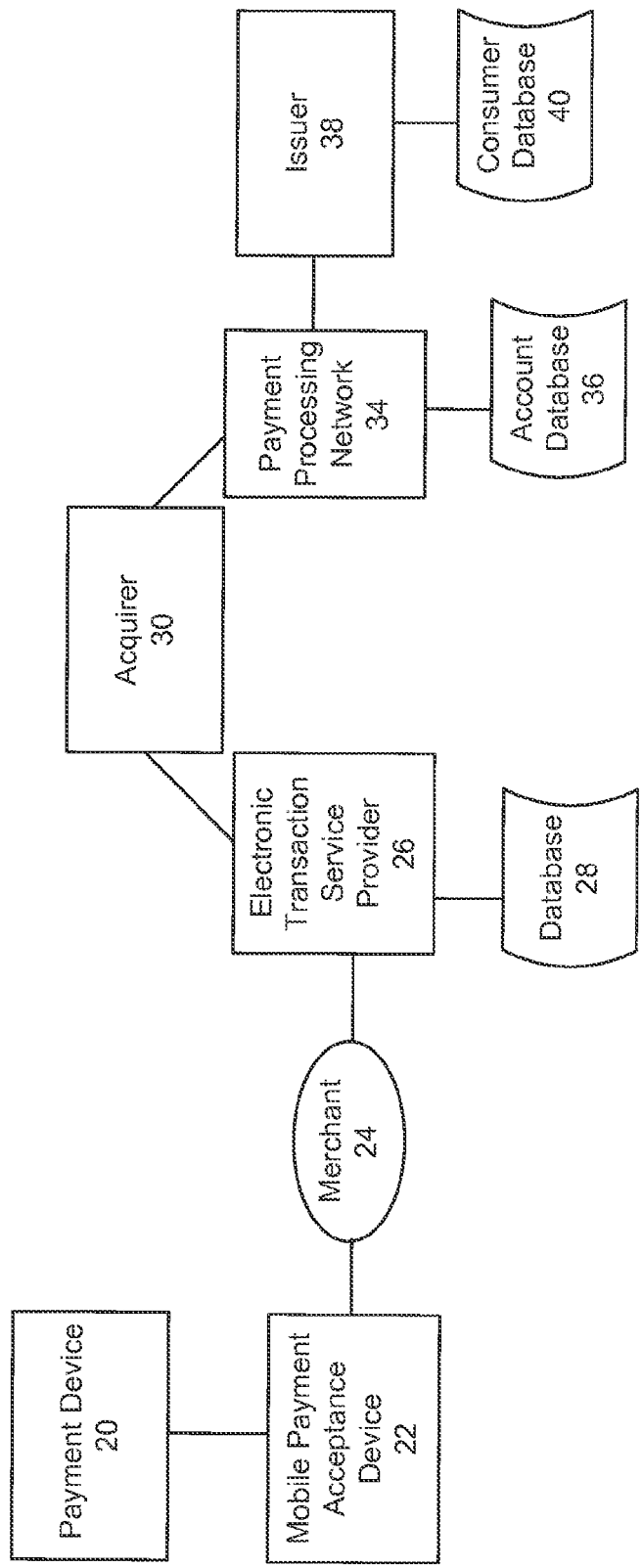
FIG. 10 is a block diagram illustrating a transaction processing system that may be used with some embodiments of the present invention.

FIG. 10 is a block diagram illustrating a transaction processing system that may be used with some embodiments of the present invention. FIG. 10 shows the primary functional elements that are typically involved in processing a purchase transaction and in the authorization process for such a transaction. As shown in FIG. 10, in a typical purchase transaction, a consumer wishing to purchase a good or service from a merchant uses a payment device 20 to provide purchase transaction data that may be used as part of a consumer authentication or transaction authorization process. Payment device 20 may be a debit card, credit card, smart card, mobile device containing a contactless chip, computer, or other suitable form of device.

The portable payment device is presented to a mobile payment acceptance device 22 of a merchant 24. For example, the acceptance device 22 could be a device reader or point of sale (POS) terminal 22 which is able to access data stored on or within the payment device. In embodiments, the portable payment device communicates account/payment information to the merchant 24 via a "card not present" transaction over a communications network, such as a cellular network, the Internet, etc. The account data (as well as any required consumer data) is communicated to the merchant 24 and ultimately to a merchant service provider 26 (such as Authorize.Net®). As part of the authentication or authorization process performed by the service provider, the service provider 26 may access database 28, which typically stores data regarding the customer/consumer/user (as the result of a registration process with the merchant, for example), the consumer's payment device, and the consumer's transaction history with the merchant. The database 28 may also include information about the merchant 24, such as a list of the merchant's approved payment acceptance devices 22. For example, upon receiving information about the payment device 20 from the merchant's mobile payment acceptance device 22, the service provider 26 may extract information that identifies the mobile payment acceptance device 22 and validate that information against a list of approved mobile payment acceptance devices. The service provider 26 typically communicates with acquirer 30 (which manages the merchant's accounts) as part of the overall authentication or authorization process. The service provider 26 and/or acquirer 30 provide data to payment processing network 34, which, among other functions, participates in the clearance and settlement processes that are part of the overall transaction processing.

Communication and data transfer between service provider 26 and payment processing network 34 are typically by means of an intermediary, such as acquirer 30. As part of the consumer authentication or transaction authorization process, payment processing network 34 may access account database 36, which typically contains information regarding the consumer's account payment history, chargeback or transaction dispute history, credit worthiness, etc. Payment processing network 34 communicates with issuer 38 as part of the authentication or authorization process, where issuer 38 is the entity that issued the payment device to the consumer and manages the consumer's account. Customer or consumer account data is typically stored in customer/consumer database 40 which may be accessed by issuer 38 as part of the authentication, authorization or account management processes. Note that instead of, or in addition to, being stored in account database 36, consumer account data may be included in, or otherwise part of, customer/consumer database 40.

According to an embodiment, in standard operation, an authorization request message is created by the mobile payment acceptance device 22 during a consumer purchase of a good or service using a portable payment device. In some embodiments, the mobile payment acceptance device 22 of the merchant 24 may be a wireless phone or personal digital assistant that incorporates a contactless card or chip or payment acceptance application. The authorization request message is typically sent from the payment application of the mobile payment acceptance device 22 to the service provider 26, and then to the merchant's acquirer 30, to a payment processing network 34, and then to an issuer 38. An authorization request message can include a request for authorization to conduct an electronic purchase transaction and data relevant to determining if the request should be granted as well as device identification information related to the mobile payment acceptance device 22, which the service provider 26 validates against the list of approved mobile payment acceptance devices 22. For example, it may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent unauthorized access to account or transaction data.

After the issuer receives the authorization request message, the issuer determines if the transaction should be authorized and sends an authorization response message back to the payment processing network to indicate whether or not the current transaction is authorized. The payment processing system then forwards the authorization response message to the acquirer. The acquirer then sends the response message to the service provider 26, which then sends the response message to the merchant's mobile payment acceptance device 22. The merchant is thus made aware of whether the issuer has authorized the transaction, and hence whether the transaction can be completed.

At a later time, a clearance and settlement process may be conducted by elements of the payment/transaction processing system depicted in FIG. 2. A clearance process involves exchanging financial details between an acquirer and an issuer to facilitate posting a transaction to a consumer's account and reconciling the consumer's settlement position. Clearance and settlement can occur simultaneously or as separate processes.

Payment processing network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing network 34 may use any suitable combination of wired or wireless networks, including the Internet, to permit communication and data transfer between network elements. Among other functions, payment processing network 34 may be responsible for ensuring that a consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

The payment device 20 may take one of many suitable forms. As mentioned above, the portable payment device can be a mobile device that incorporates a contactless element such as a chip for storing payment information (e.g., a BIN number, account number, etc.) and a near field communications (NFC) data transfer element such as an antenna, a light emitting diode, a laser, etc. The portable payment device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable payment device may also incorporate the ability to perform debit functions (e.g., a debit card), credit functions (e.g., a credit card), or stored value functions (e.g., a stored value or prepaid card).

Figure 11:
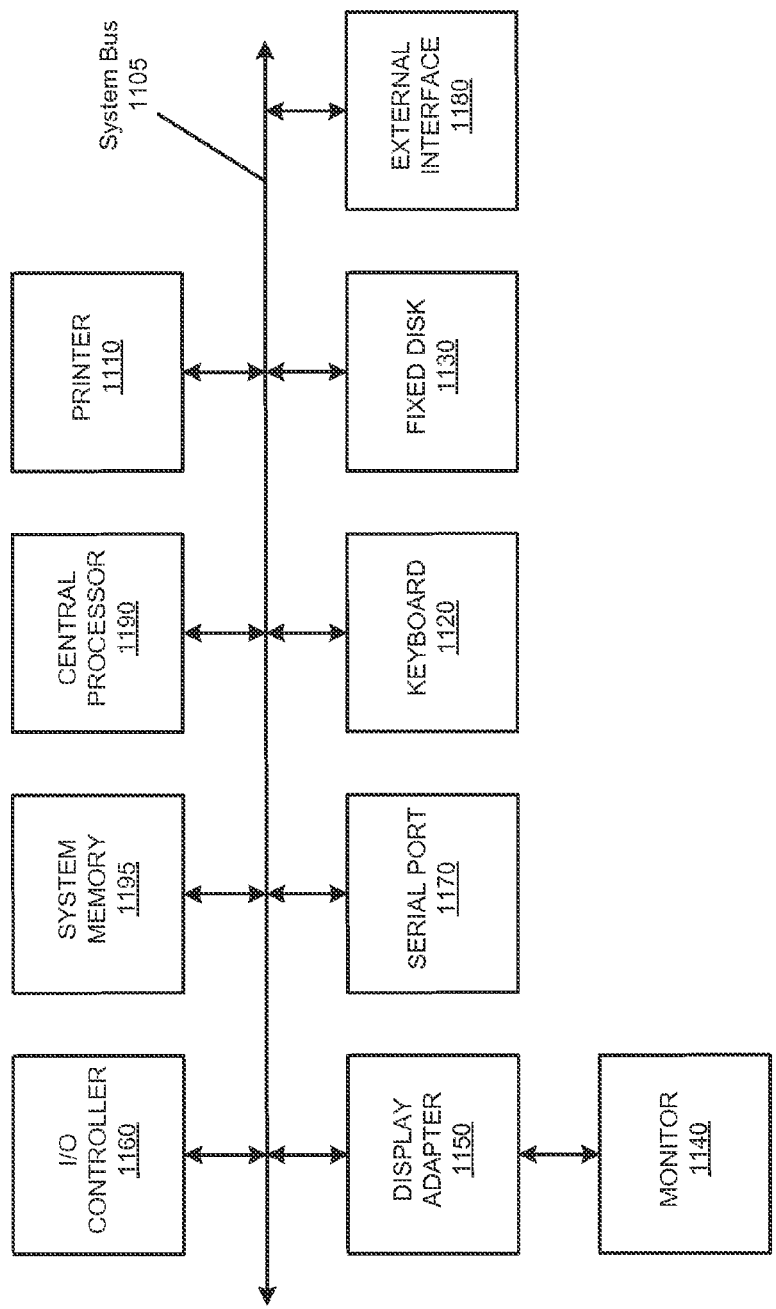
FIG. 11 is a block diagram of an exemplary computer apparatus that can be used in some embodiments of the invention.

The various participants and elements in FIGS. 1-3 and FIG. 10 may operate one or more computer apparatuses (e.g., a server computer or a computing device) to facilitate the functions described herein. Any of the elements in FIGS. 1-3 and FIG. 10 may use any suitable number of subsystems to facilitate the functions described herein. Examples of such subsystems or components are shown in FIG. 11. FIG. 11 is a block diagram of an exemplary computer apparatus that can be used in some embodiments of the invention (e.g., in any of the components shown in the prior Figures).

The subsystems shown in FIG. 11 are interconnected via a system bus 1105. Additional subsystems such as a printer 1110, keyboard 1120, fixed disk 1130 (or other memory comprising computer readable media), monitor 1140, which is coupled to display adapter 1150, and others are shown. Peripherals and input/output (I/O) devices, which couple to I/O controller 1160, can be connected to the computer system by any number of means known in the art, such as through serial port 1170. For example, serial port 1170 or external interface 1180 can be used to connect the computer apparatus to a wide area network such as the Internet, a mouse input device, or a scanner. The interconnection via system bus 1105 allows the central processor 1190 to communicate with each subsystem and to control the execution of instructions from system memory 1195 or the fixed disk 1130, as well as the exchange of information between subsystems. The system memory 1195 and/or the fixed disk 1130 may embody a computer readable medium.

The previous description of the embodiments is provided to enable any person skilled in the art to practice the invention.

The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein. For example, although some specific embodiments describe the use of a message conversion process with typical brick and mortar type merchants, embodiments of the invention can also be used in on-line e-commerce type transactions.

Embodiments of the invention are not limited to the above-described embodiments. For example, although separate functional blocks are shown for a merchant, a commerce system, an issuer, payment processing system, and acquirer, some entities perform all of these functions and may be included in embodiments of invention. Further, additional embodiments of the invention may be directed to methods and systems involving merchants, and their access devices, as well as issuers. For example, other embodiments may include the following additional embodiments.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method, comprising:
    receiving, by a server computer of a service provider, a session request to establish a session for communication with a computing device to conduct a payment transaction between a merchant and a consumer;
    sending, by the server computer, activation information to the computing device, wherein the activation information includes a uniform resource locator that identifies a location of a webpage on the server computer, and wherein interaction with a prompt on the webpage enables operation of a reader device to receive payment information from a portable device;
    receiving, from the computing device in response to the computing device, receiving of the activation information, a request to retrieve the webpage at the location on the server computer;
    upon retrieval of the webpage at the location, sending the webpage to the computing device;
    receiving, by the server computer, from the computing device, encrypted payment information via an order form of the webpage, wherein the encrypted payment information is encrypted at the reader device based on the payment information received from the portable device, and wherein the order form includes the encrypted payment information received from the reader device; and
    processing, by the processor, the payment transaction based on the encrypted payment information received via the order form.

2. The method of claim 1, wherein the webpage is a hosted order page, wherein the encrypted payment information is inserted in the order form, and wherein the encrypted payment information is received via the order form in response to a post function executed for the order form.

3. The method of claim 1, wherein processing the payment transaction further comprises:
    sending, by the server computer, a decryption request to a payment processing system to decrypt the payment information;
    receiving, by the server computer, a decryption result in response to the decryption request;
    sending, by the server computer, an authorization request to the payment processing system to determine authorization for the payment transaction; and
    receiving, by the server computer, an authorization result in response to the authorization request.

4. The method of claim 1, further comprising:
    sending, by the server computer, to a merchant system a notification of a payment result of processing the payment transaction; and
    sending, by the server computer, to the computing device the payment result of processing the payment transaction.

5. The method of claim 1, wherein the encrypted payment information is received via the order form of the webpage from the computing device using a Secure Sockets Layer (SSL) in the session.

6. The method of claim 1, wherein in response to interaction with the prompt, the computing device requests the reader device for the encrypted payment information.

7. A gateway server computer, comprising:
    one or more processors; and
    one or more memory devices coupled to the one or more processors, the one or more memory devices comprising instructions executable by the one or more processors to perform a method comprising:
        receiving a session request to establish a session for communication with a computing device to conduct a payment transaction between a merchant and a consumer;
        sending activation information to the computing device, wherein the activation information includes a uniform resource locator that identifies a location of a webpage in the one or more memory devices, and wherein interaction with a prompt on the webpage enables operation of a reader device to receive payment information from a portable device;

receiving, from the computing device in response to the computing device receiving of the activation information, a request to retrieve the webpage at the location in the one or more memory devices;

upon retrieval of the webpage at the location, sending the webpage to the computing device;

receiving from the computing device, encrypted payment information via an order form of the webpage, wherein the encrypted payment information is encrypted at the reader device based on the payment information received from the portable device, and wherein the order form includes the encrypted payment information received from the reader device; and processing the payment transaction based on the encrypted payment information received via the order form.

8. The gateway server computer of claim 7, wherein the webpage is associated with the merchant, and wherein the one or more memory devices stores different activation information for each of a plurality of webpages, each webpage of the plurality of webpages corresponding to a different one of a plurality of merchants.

9. The gateway server computer of claim 7, wherein the payment information is requested from the portable device in response to the interaction with prompt on the webpage.

10. The gateway server computer of claim 7, wherein the webpage is a hosted order page hosted by the gateway server computer, wherein the encrypted payment information is inserted in the order form, and wherein the encrypted payment information is received via the order form in response to a post function executed for the order form.

11. A system, comprising:
a client system configured to:
send to a merchant system a request to initiate payment for a payment transaction between a merchant and a consumer;
receive activation information from a server computer of a service provider, wherein the activation information including a uniform resource locator that identifies a location of a webpage in the server computer, and wherein interaction with a prompt on the webpage enables operation of a reader device to receive payment information from a portable device;
in response to receiving of the activation information, send, to the server computer, a request to retrieve the webpage at the location on the server computer;
receive, from the server computer, the webpage;
in response to receiving input corresponding to an interaction with the prompt on the webpage, enable operation of the reader device to receive the payment information from the portable device;
receive encrypted payment information from the reader device in response to operation of the reader device to receive the payment information from the portable device, wherein the encrypted payment information is encrypted based on the payment information at the reader device received from the portable device;
insert the encrypted payment information into an order form of the webpage; and
cause the encrypted payment information to be submitted to the server computer via the order form of the webpage for payment processing; and a server system configured to:
receive a session request to establish a session for communication with the client system to conduct the payment transaction, wherein the session request is received from the merchant system in response to receiving the request to initiate payment for the payment transaction;
send the activation information to the client system;
receive, from the client system, the request to retrieve the webpage at the location on server computer;
upon retrieval of the webpage at the location, send the webpage to the client system;
receive the encrypted payment information via the order form of the webpage; and
process the payment transaction based on the encrypted payment information.

12. A method, comprising:
sending, from a computing device, a request to a merchant system to initiate payment for a transaction between a merchant and a consumer;
receiving, by the computing device, activation information from a server computer of a service provider, wherein the activation information includes a uniform resource locator that identifies a location of a webpage in the server computer, and wherein interaction with a prompt on the webpage enables operation of a reader device to receive payment information from a portable device;
in response to receiving of the activation information, sending, to the server computer, a request to retrieve the webpage at the location on the server computer;
receiving, from the server computer, the webpage;
in response to receiving input corresponding to an interaction with the prompt on the webpage, enabling operation of the reader device to receive the payment information from the portable device;
receiving, by the computing device, encrypted payment information from the reader device in response to operation of the reader device to receive the payment information from the portable device, wherein the encrypted payment information is encrypted based on the payment information received at the reader device from the portable device;
inserting, by the computing device, the encrypted payment information into an order form of the webpage; and
causing, by the computing device, the encrypted payment information to be submitted to the server computer via the order form of the webpage for payment processing.

13. The method of claim 12, wherein the request to initiate payment is initiated via a merchant webpage provided by the merchant system, and wherein the request causes the merchant system to send a session request to the server computer to establish a session for communication between the computing device and the server computer to conduct the transaction.

14. The method of claim 12, wherein the payment information for the transaction is encrypted based on a key derived for the transaction, and wherein the key derived for the transaction is based on an encryption key received from a security service provider.

15. The method of claim 12, wherein the security service provider is distinct from the service provider that processes the payment information.

16. The method of claim 12, wherein the webpage is a hosted order page, and wherein causing the encrypted payment information to be submitted includes executing a post function call on the order form of the webpage.

17. The method of claim 12, further comprising:
receiving, by the computing device, from the service provider, a payment result of the processing the transaction.

18. The method of claim 12, further comprising:
sending, by the computing device, a request for the encrypted payment information from the reader device, wherein the request is sent in response to operation of the prompt on the webpage.

19. The method of claim 12, wherein the webpage is associated with the merchant, and wherein the one or more memory devices stores different activation information for each of a plurality of webpages, each webpage of the plurality of webpages corresponding to a different one of a plurality of merchants.

20. The method of claim 12, wherein the request to the merchant system to initiate payment for the transaction is initiated via a merchant website hosted by the merchant system.

\* \* \* \* \*